United States Patent
Frey et al.

(10) Patent No.: US 9,835,753 B2
(45) Date of Patent: Dec. 5, 2017

(54) GAIN COMPENSATED TENSOR PROPAGATION MEASUREMENTS USING COLLOCATED ANTENNAS

(71) Applicant: Schlumberger Technology Corporation, Sugar Land, TX (US)

(72) Inventors: Mark Frey, Sugar Land, TX (US); Dean M. Homan, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 60 days.

(21) Appl. No.: 14/912,901

(22) PCT Filed: Aug. 21, 2014

(86) PCT No.: PCT/US2014/051998
§ 371 (c)(1),
(2) Date: Feb. 18, 2016

(87) PCT Pub. No.: WO2015/027010
PCT Pub. Date: Feb. 26, 2015

(65) Prior Publication Data
US 2016/0209540 A1 Jul. 21, 2016

Related U.S. Application Data

(60) Provisional application No. 61/868,451, filed on Aug. 21, 2013.

(51) Int. Cl.
G01V 3/28 (2006.01)
G01V 3/10 (2006.01)
G01V 3/18 (2006.01)
G01V 3/38 (2006.01)

(52) U.S. Cl.
CPC ............ *G01V 3/28* (2013.01); *G01V 3/104* (2013.01); *G01V 3/18* (2013.01); *G01V 3/38* (2013.01)

(58) Field of Classification Search
CPC ... G01V 3/28; G01V 3/38; G01V 3/18; G01V 3/104; G01V 3/30
(Continued)

(56) References Cited

U.S. PATENT DOCUMENTS

| 6,798,208 B2 * | 9/2004 | Omeragic | G01V 3/28 324/338 |
| 7,937,221 B2 * | 5/2011 | Zhdanov | G01V 3/28 702/6 |

(Continued)

FOREIGN PATENT DOCUMENTS

| EP | 2447738 A1 | 5/2012 |
| WO | 2007015992 A1 | 2/2007 |

(Continued)

OTHER PUBLICATIONS

International Search Report and the Written Opinion for International Application No. PCT/US2014/051998 dated Nov. 28, 2014.

*Primary Examiner* — Julian Huffman
*Assistant Examiner* — Michael Konczal

(57) ABSTRACT

A method for obtaining full tensor gain compensated propagation measurements includes processing a full tensor voltage measurement to obtain a fully gain compensated tensor quantity. An electromagnetic logging tool including at least first and second axially spaced transmitters and at least first and second axially spaced receivers is rotated in a subterranean borehole. A plurality of voltage measurements are acquired while rotating to obtain a full tensor voltage measurement which is in turn processed to obtain the fully gain compensated tensor quantity.

22 Claims, 6 Drawing Sheets

FIG. 5

(58) Field of Classification Search
USPC .................................................. 702/2, 5, 6, 7
See application file for complete search history.

(56) References Cited

U.S. PATENT DOCUMENTS

| | | |
|---|---|---|
| 8,368,403 B2 | 2/2013 | Homan et al. |
| 9,134,449 B2 | 9/2015 | Seydoux et al. |
| 2005/0083161 A1* | 4/2005 | Minerbo .................. G01V 3/28 336/132 |
| 2007/0024286 A1 | 2/2007 | Wang |
| 2008/0143336 A1 | 6/2008 | Legendre et al. |
| 2009/0015261 A1 | 1/2009 | Yang et al. |
| 2011/0074427 A1 | 3/2011 | Wang et al. |
| 2011/0140701 A1* | 6/2011 | Legendre ................. G01V 3/28 324/339 |
| 2011/0238312 A1 | 9/2011 | Seydoux et al. |
| 2011/0309833 A1 | 12/2011 | Yang |
| 2012/0068712 A1* | 3/2012 | Taherian ................ G01V 1/282 324/338 |
| 2012/0105076 A1 | 5/2012 | Li et al. |
| 2012/0242342 A1 | 9/2012 | Rabinovich et al. |
| 2013/0073206 A1 | 3/2013 | Hou et al. |
| 2013/0191028 A1 | 7/2013 | Homan et al. |

FOREIGN PATENT DOCUMENTS

| | | |
|---|---|---|
| WO | 2012129058 A2 | 9/2012 |
| WO | 2013095997 A1 | 6/2013 |
| WO | 2015027002 A1 | 2/2015 |
| WO | 2015027010 A1 | 2/2015 |

* cited by examiner

GAIN COMPENSATED TENSOR PROPAGATION MEASUREMENTS USING COLLOCATED ANTENNAS

CROSS REFERENCE TO RELATED APPLICATIONS

This application claims priority as a Patent Cooperation Treaty patent application of U.S. Provisional patent application Ser. No. 61/868,451 filed Aug. 21, 2013 with the same title.

TECHNICAL FIELD

Disclosed embodiments relate generally to downhole electromagnetic logging methods and more particularly to a method for making full tensor, gain compensated propagation measurements such as phase shift and attenuation measurements.

BACKGROUND INFORMATION

The use of electromagnetic measurements in prior art downhole applications, such as logging while drilling (LWD) and wireline logging applications is well known. Such techniques may be utilized to determine a subterranean formation resistivity, which, along with formation porosity measurements, is often used to indicate the presence of hydrocarbons in the formation. Moreover, azimuthally sensitive directional resistivity measurements are commonly employed e.g., in pay-zone steering applications, to provide information upon which steering decisions may be made.

Downhole electromagnetic measurements are commonly inverted using a formation model to obtain various formation parameters, for example, including vertical resistivity, horizontal resistivity, distance to a remote bed, resistivity of the remote bed, dip angle, and the like. One challenge in utilizing directional electromagnetic resistivity measurements, is obtaining a sufficient quantity of data to perform a reliable inversion. The actual formation structure is frequently much more complex than the formation models used in the inversion. The use of full tensor propagation measurements may enable a full tensor measurement of the formation properties to be obtained. However, finding reliable techniques for providing an accurate gain compensated full tensor measurement has been a challenge for the industry.

SUMMARY

A method for obtaining full tensor gain compensated propagation measurements is disclosed. The method includes rotating an electromagnetic logging tool in a subterranean borehole. The logging tool includes at least first and second axially spaced transmitters and at least first and second axially spaced receivers. The transmitters or receivers may include at least one antenna having a tilted moment with respect to the longitudinal axis of the logging tool. A plurality of voltage measurements is acquired while rotating the tool in the borehole. The voltage measurements may be fit to a harmonic expression to obtain harmonic coefficients. The voltage measurements are processed to construct a full tensor voltage measurement which is in turn further processed to obtain a full tensor gain compensated quantity.

In accordance with one embodiment, a method for obtaining full tensor gain compensated propagation measurements includes (a) rotating an electromagnetic logging tool in a subterranean borehole, the logging tool including at least first and second axially spaced transmitters and at least first and second axially spaced receivers, each of the receivers including a set of collocated linearly independent antennas, each of the transmitters including first and second collocated antennas, and with at least the first transmitter antenna having a tilted moment with respect to a longitudinal axis of the tool. The method further includes (b) acquiring a plurality of voltage measurements while rotating the tool in (a), the plurality of voltage measurements being obtained using a corresponding plurality of pairs of the transmitters and receivers, (c) fitting the voltage measurements to a harmonic expression to obtain harmonic coefficients, (d) causing a processor to process the harmonic coefficients to construct a full tensor voltage measurement, and (e) causing the processor to process the full tensor voltage measurement to obtain a fully gain compensated tensor quantity.

In accordance with another embodiment, a system includes an electromagnetic logging tool having at least first and second axially spaced transmitters and at least first and second axially spaced receivers, each of the receivers including a set of collocated linearly independent antennas, each of the transmitters including first and second collocated antennas, at least the first transmitter antenna having a tilted moment with respect to a longitudinal axis of the tool. The electromagnetic logging tool acquires a plurality of voltage measurements while rotating the electromagnetic logging tool in a borehole formed in a subterranean formation, with the plurality of voltage measurements being obtained using a corresponding plurality of pairs of the transmitters and receivers. The system further includes a processor that fits the voltage measurements to a harmonic expression to obtain harmonic coefficients, processes the harmonic coefficients to construct a full tensor voltage measurement, and processes the full tensor voltage measurement to obtain a fully gain compensated tensor quantity.

In accordance with another embodiment, a method for obtaining gain compensated full tensor electromagnetic antenna measurements includes (a) rotating an electromagnetic logging tool in a subterranean borehole, the logging tool including at least first and second axially spaced transmitters and at least first and second axially spaced receivers, each of the receivers including a set of collocated linearly independent antennas, each of the transmitters including first and second collocated calibration antennas having transverse moments with respect to one another and with respect to the longitudinal axis of the tool, and each of the transmitters further including a tilted antenna not collocated with the first and second calibration antennas and having a tilted moment with respect to a longitudinal axis of the tool. The method further includes (b) acquiring a plurality of voltage measurements while rotating the tool in (a), the plurality of voltage measurements obtained using a corresponding plurality of pairs of the tilted transmitter antennas and the triaxial receiver antennas, (c) fitting the voltage measurements to a harmonic expression to obtain harmonic coefficients, (d) causing a processor to process the harmonic coefficients to construct a full tensor voltage measurement, and (e) causing the processor to process the full tensor voltage measurement to obtain a fully gain compensated tensor quantity.

In accordance with yet another embodiment, a system includes an electromagnetic logging tool having at least first and second axially spaced transmitters and at least first and second axially spaced receivers, each of the receivers including a set of collocated linearly independent antennas, each of the transmitters including first and second collocated calibration antennas having transverse moments with respect to one another and with respect to the longitudinal axis of the tool, each of the transmitters further including a tilted antenna not collocated with the first and second calibration antennas and having a tilted moment with respect to a longitudinal axis of the tool. The electromagnetic logging tool acquires a plurality voltage measurements while rotating in a subterranean borehole, the plurality of voltage measurements being obtained using a corresponding plurality of pairs of the tilted transmitter antennas and the triaxial receiver antennas. The system also includes a processor that fits the voltage measurements to a harmonic expression to obtain harmonic coefficients, processes the harmonic coefficients to construct a full tensor voltage measurement, and processes the full tensor voltage measurement to obtain a fully gain compensated tensor quantity.

The disclosed embodiments may provide various technical advantages. For example, the disclosed methodology provides for full tensor gain compensated propagation measurements. The measurements are sensitive to vertical and horizontal formation resistivity (anisotropy) as well the presence of a remote bed boundary at all dip angles. The full tensor measurements may therefore be utilized in an inversion to obtain the vertical and horizontal resistivity of local and remote beds, as well as the distance and dip angle to the boundary. Moreover, the full tensor gain compensated propagation measurements are sensitive to the full three dimensional conductivity tensor and therefore may provide information on the three dimensional structure of the formation, for example, including faults, fractures, folded layers, and unconformities.

This summary is provided to introduce a selection of concepts that are further described below in the detailed description and is intended to familiarize the reader with certain aspects and contexts of embodiments of the present disclosure without limitation to the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
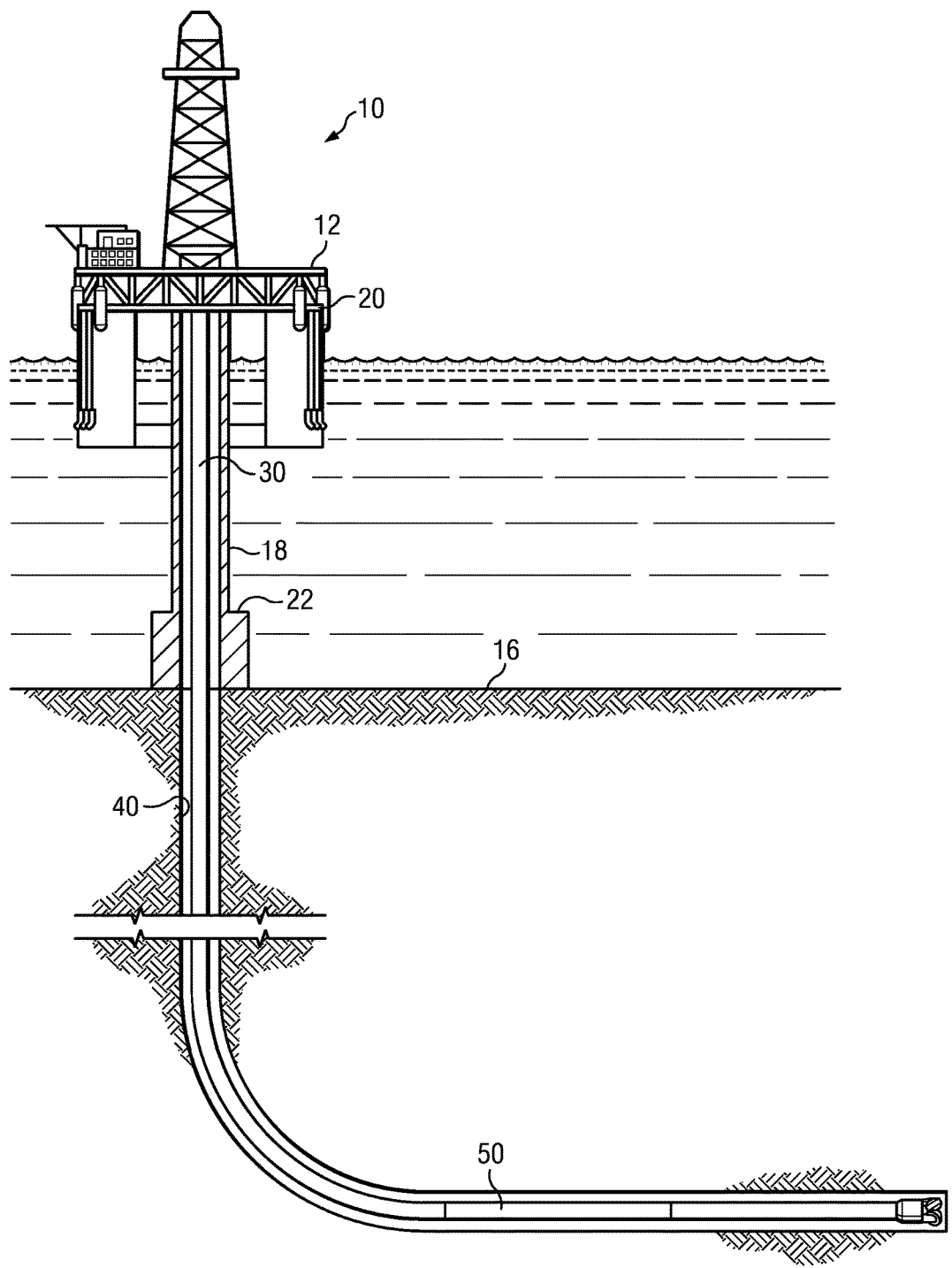
FIG. 1 depicts one example of a rig on which electromagnetic logging tools may be utilized.

FIG. 1 depicts an example drilling rig 10 suitable for employing various method embodiments disclosed herein. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40 and includes a drill bit 32 deployed at the lower end of a bottom hole assembly (BHA) that further includes an electromagnetic measurement tool 50 configured to make full three dimensional tensor electromagnetic logging measurements.

It will be understood that the deployment illustrated on FIG. 1 is merely an example. Drill string 30 may include substantially any suitable downhole tool components, for example, including a steering tool such as a rotary steerable tool, a downhole telemetry system, and one or more MWD or LWD tools including various sensors for sensing downhole characteristics of the borehole and the surrounding formation. The disclosed embodiments are by no means limited to any particular drill string configuration.

It will be further understood that disclosed embodiments are not limited to use with a semisubmersible platform 12 as illustrated on FIG. 1. The disclosed embodiments are equally well suited for use with either onshore or offshore subterranean operations.

Figure 2A:
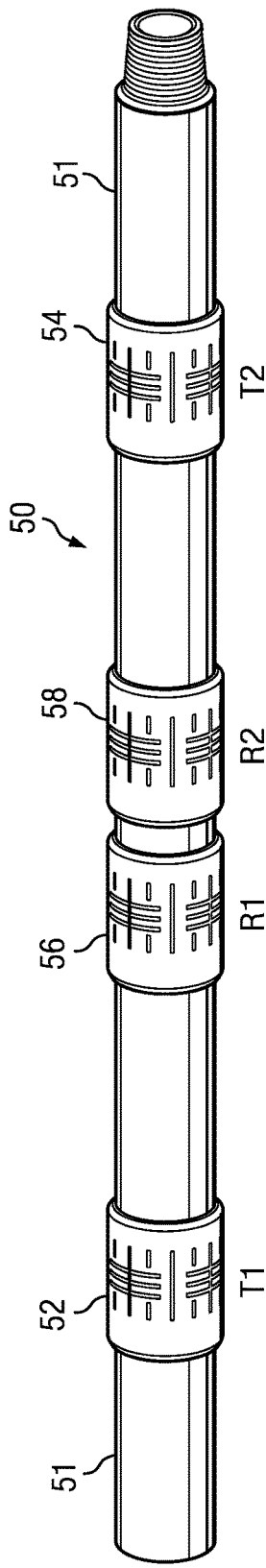
FIG. 2A depicts one example of the electromagnetic logging tool shown on FIG. 1.

FIG. 2A depicts one example of electromagnetic measurement tool 50. In the depicted embodiment measurement tool 50 includes a logging-while-drilling (LWD) tool having first and second triaxial transmitters T1 and T2 depicted at 52 and 54 and first and second receivers R1 and R2 depicted at 56 and 58 spaced axially along LWD tool body 51. In the depicted embodiment, each of the transmitters 52, 54 and receivers 56, 58 includes a collocated linearly independent antenna arrangement.

Electromagnetic logging tools commonly use axial, transverse, and/or tilted antennas. An axial antenna is one whose moment is substantially parallel with the longitudinal axis of the tool. Axial antennas are commonly wound about the circumference of the logging tool such that the plane of the antenna is substantially orthogonal to the tool axis. A transverse antenna is one whose moment is substantially perpendicular to the longitudinal axis of the tool. A transverse antenna may include a saddle coil (e.g., as disclosed in U.S. Patent Publications 2011/0074427 and 2011/0238312, incorporated herein by reference). A tilted antenna is one whose moment is neither parallel nor perpendicular to the longitudinal axis of the tool. Tilted antennas generate a mixed mode radiation pattern (i.e., a radiation pattern in which the moment is neither parallel nor perpendicular with the tool axis). It will be understood that a tilted antenna is not necessarily tilted in the sense that a plane of the antenna is tilted with respect to the tool axis. By tilted it is meant that the antenna has a tilted moment with respect to the axis.

Figure 2B:
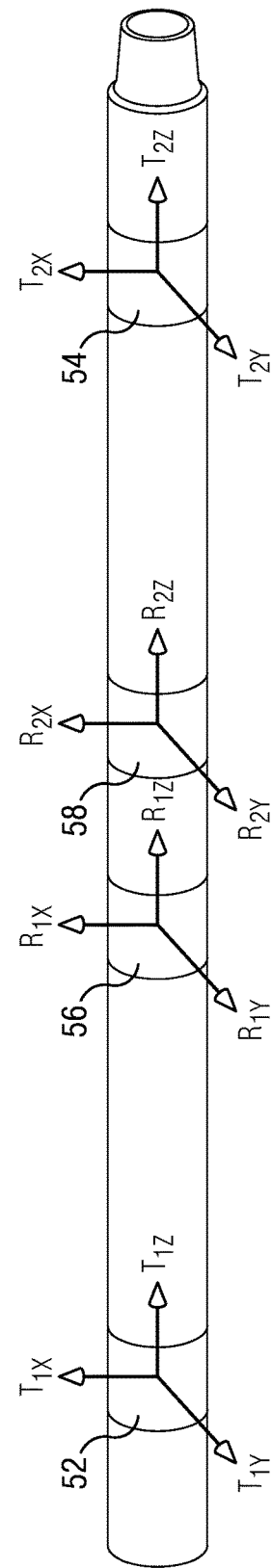
FIG. 2B schematically depicts an electromagnetic logging tool including collocated triaxial transmitters and receivers.

As stated above with respect to FIG. 2A, the transmitters 52, 54 and receivers 56, 58 each include a collocated linearly independent antenna arrangement (one example arrangement of which is depicted schematically on FIG. 2B). A triaxial antenna arrangement (also referred to as a triaxial transmitter, receiver, or transceiver) is one example of a linearly independent antenna arrangement in which two or three antennas (i.e., up to three distinct antenna coils) are arranged to be mutually independent. By mutually independent it is meant that the moment of any one of the antennas does not lie in the plane formed by the moments of the other antennas. Three tilted antennas is one common example of a triaxial antenna sensor. Three collocated orthogonal antennas, with one antenna axial and the other two transverse, is another common example of a triaxial antenna sensor.

FIG. 2B depicts the moments of triaxial transmitters 52, 54 and receivers 56, 58. Each of the transmitters 52, 54 includes an axial antenna $T1_z$ and $T2_z$ and first and second transverse antennas $T1_x$, $T1_y$ and $T2_x$, $T2_y$. Likewise, each of the receivers 56, 58 includes an axial antenna $R1_z$ and $R2_z$ and first and second transverse antennas $R1_x$, $R1_y$ and $R2_x$, $R2_y$. In the depicted embodiment, the moments of the transmitter and receiver antennas are mutually orthogonal and aligned with the x, y, and z axes as indicated in a conventional borehole reference frame in which the z-axis is coincident with the axis of the tool. It will be understood that the disclosed embodiments are expressly not limited in this regard.

Figure 2C:
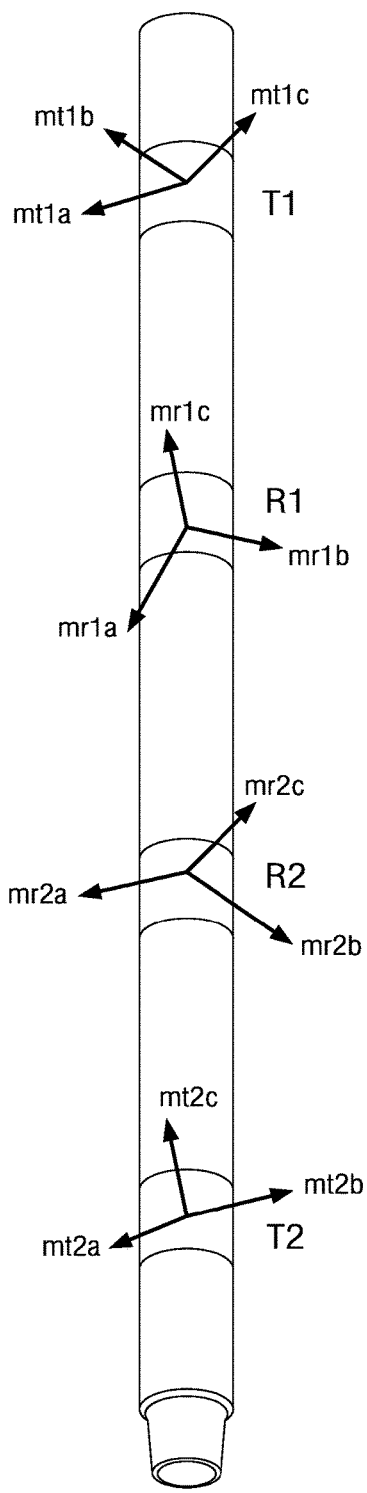
FIG. 2C schematically depicts an electromagnetic logging tool including collocated linearly independent transmitter and receiver triads in which the a, b, and c antenna are not necessarily aligned with the x, y, and z axis of the logging tool.

FIG. 2C depicts the moments of a more generalized antenna arrangement including first and second axially spaced transmitter and receiver triads in which the moments of each of the transmitter and receiver antennas define three linearly independent directions a, b, and c. It will be understood that the a, b, and c directions are not necessarily mutually orthogonal. Nor are they necessarily aligned with the x, y, and z axes of a borehole reference frame or any other reference frame. Moreover, the a, b, and c directions of the moments of any one transmitter or receiver are not necessarily aligned with the a, b, and c directions of the moments of any of the other transmitters or receivers.

As is known to those of ordinary skill in the art, a time varying electric current (an alternating current) in a transmitting antenna produces a corresponding time varying magnetic field in the local environment (e.g., the tool collar and the formation). The magnetic field in turn induces electrical currents (eddy currents) in the conductive formation. These eddy currents further produce secondary magnetic fields which may produce a voltage response in a receiving antenna. The measured voltage in the receiving antennae can be processed, as is known to those of ordinary skill in the art, to obtain one or more properties of the formation.

Full Tensor Coupling with Rotation and Bending

From Ampere's law, the relationship between the induced magnetic field and the current flow $\vec{J}$ and displacement current $\partial D$ due to an electric field $\vec{E}$ applied to a material with conductivity $\overline{\overline{\sigma}}$ and dielectric constant $\overline{\overline{\mathcal{E}}}$ is not necessarily in the same direction as the applied electric field.

$$\vec{\nabla} \times \vec{H} = \vec{J} + \partial D = \overline{\overline{\sigma}} \vec{E} = (\overline{\overline{\sigma}} - i\omega\overline{\overline{\mathcal{E}}})\vec{E} = \overline{\overline{\sigma}}' \vec{E} \quad (1)$$

In general the earth is anisotropic such that its electrical properties may be expressed as a tensor which contains information on formation resistivity anisotropy, dip, bed boundaries and other aspects of formation geometry. Thus the three dimensional current flow $\vec{J}$ may be expressed as follows:

$$J_x + \partial D_x = \sigma'_{xx} E_x + \sigma'_{xy} E_y + \sigma'_{xz} E_z \quad (2)$$

$$J_y + \partial D_y = \sigma'_{yx} E_x + \sigma'_{yy} E_y + \sigma'_{yz} E_z \quad (3)$$

$$J_z + \partial D_z = \sigma'_{zx} E_x + \sigma'_{zy} E_y + \sigma'_{zz} E_z \quad (4)$$

where the full (three dimensional) conductivity tensor may be given as follows:

$$\sigma' = \begin{bmatrix} \sigma'_{xx} & \sigma'_{xy} & \sigma'_{xz} \\ \sigma'_{yx} & \sigma'_{yy} & \sigma'_{yz} \\ \sigma'_{zx} & \sigma'_{zy} & \sigma'_{zz} \end{bmatrix} \quad (5)$$

The mutual couplings between the collocated triaxial transmitter coils and the collocated triaxial receiver coils depicted on FIGS. 2A and 2B form a full tensor and have sensitivity to the full conductivity tensor given in Equation 5. The measured voltage V may be expressed as a full tensor as follows:

$$V = \begin{bmatrix} V_{xx} & V_{xy} & V_{xz} \\ V_{yx} & V_{yy} & V_{yz} \\ V_{zx} & V_{zy} & V_{zz} \end{bmatrix} = IZ = \begin{bmatrix} I_x & 0 & 0 \\ 0 & I_y & 0 \\ 0 & 0 & I_z \end{bmatrix} \begin{bmatrix} Z_{xx} & Z_{xy} & Z_{xz} \\ Z_{yx} & Z_{yy} & Z_{yz} \\ Z_{zx} & Z_{zy} & Z_{zz} \end{bmatrix} \quad (6)$$

where V represents the measured voltage tensor in the receiver coils, I represents the transmitter currents, and Z represents the transfer impedance which depends on the electrical and magnetic properties of the environment surrounding the coil pair in addition to the frequency, coil geometry, and coil spacing. The first letter in the subscript in the V and Z tensors corresponds to the direction of the transmitter while the second corresponds to the direction of the receiver. For example $Z_{xx}$ represents the mutual coupling between a transmitter firing with current $I_x$ and aligned with the x axis and the receiver aligned with the x-axis, $Z_{yx}$ represents the mutual coupling between the y transmitter firing with current $I_y$ and the x-axis receiver, and so on.

With continued reference to FIGS. 2A, 2B, and 2C, the measured voltage of any particular antenna coil (for a given transmitter current) can be related to a number of factors, such as the induced voltage in a subterranean formation, the direct coupling voltage on the coil, the induced voltage from the collar, as well as the transmitter and receiver gains.

$$V = G_T Z G_R = \begin{bmatrix} g_{Tx} & 0 & 0 \\ 0 & g_{Ty} & 0 \\ 0 & 0 & g_{Tz} \end{bmatrix} \begin{bmatrix} Z_{xx} & Z_{xy} & Z_{xz} \\ Z_{yx} & Z_{yy} & Z_{yz} \\ Z_{zx} & Z_{zy} & Z_{zz} \end{bmatrix} \begin{bmatrix} g_{Rx} & 0 & 0 \\ 0 & g_{Ry} & 0 \\ 0 & 0 & g_{Rz} \end{bmatrix} \quad (7)$$

where $G_T$ represents a diagonal matrix of the transmitter gains $g_{Tx}$, $g_{Ty}$, and $g_{Tz}$ and $G_R$ represents a diagonal matrix of the receiver gains $g_{Rx}$, $g_{Ry}$, and $g_{Rz}$. It will be understood that in Equation 7, the transmitter currents I are included in the generalized transmitter gains. If the magnetic field produced by the transmitter coil is approximately constant in magnitude and direction across the receiver coil, then the mutual inductive coupling scales with the number of turns in the antenna coil and the effective coil areas of the transmitter and receiver. However, as described above with respect to FIG. 2C, the antenna moments are not necessarily perfectly aligned with the x, y, and z coordinate axes, nor are they necessarily mutually orthogonal. Thus Equation 7 may be written in a such way that the gains include a generalized gain times a unit vector that points in the direction normal to the area enclosed by the antenna coil, for example, as follows:

$$V = \begin{bmatrix} g_{Ta} & 0 & 0 \\ 0 & g_{Tb} & 0 \\ 0 & 0 & g_{Tc} \end{bmatrix} \begin{bmatrix} m_{Tax} & m_{Tbx} & m_{Tcx} \\ m_{Tay} & m_{Tby} & m_{Tcy} \\ m_{Taz} & m_{Tbz} & m_{Tcz} \end{bmatrix}^t \begin{bmatrix} m_{Rax} & m_{Rbx} & m_{Rcx} \\ m_{Ray} & m_{Rby} & m_{Rcy} \\ m_{Raz} & m_{Rbz} & m_{Rcz} \end{bmatrix} \begin{bmatrix} g_{Ra} & 0 & 0 \\ 0 & g_{Rb} & 0 \\ 0 & 0 & g_{Rc} \end{bmatrix} \quad (8)$$

$$= \begin{bmatrix} g_{Ta}g_{Ta}\hat{m}_{Ta}^t Z \hat{m}_{Ra} & g_{Ta}g_{Rb}\hat{m}_{Ta}^t Z \hat{m}_{Rb} & g_{Ta}g_{Rc}\hat{m}_{Ta}^t Z \hat{m}_{Rc} \\ g_{Tb}g_{Ta}\hat{m}_{Tb}^t Z \hat{m}_{Ra} & g_{Tb}g_{Rb}\hat{m}_{Tb}^t Z \hat{m}_{Rb} & g_{Tb}g_{Rc}\hat{m}_{Tb}^t Z \hat{m}_{Rc} \\ g_{Tc}g_{Ta}\hat{m}_{Tc}^t Z \hat{m}_{Ra} & g_{Tc}g_{Rb}\hat{m}_{Tc}^t Z \hat{m}_{Rb} & g_{Tc}g_{Rc}\hat{m}_{Tc}^t Z \hat{m}_{Rc} \end{bmatrix}$$

$$= G_T m_T^t Z m_R G_R$$

where t represents the transpose of the corresponding matrix. The subscripts a, b, and c refer to the antenna triad moment directions and define three linearly independent directions. It will be understood that a, b, and c are not necessarily mutually orthogonal. The matrix terms $m_{Tax}$, $m_{Tay}$, and $m_{Taz}$ represent projections of a unit vector $\hat{m}_{Ta}$ that is in the direction of the 'a' transmitter moment on the x, y, and z coordinate axes; $m_{Tbx}$, $m_{Tby}$, and $m_{Tbz}$ represent projections of a unit vector $\hat{m}_{Tb}$ that is in the direction of the 'b' transmitter moment on the x, y, and z coordinate axes; and $m_{Tcx}$, $m_{Tcy}$, and $m_{Tcz}$ represent projections of a unit vector $\hat{m}_{Tc}$ that is in the direction of the 'c' transmitter moment on the x, y, and z coordinate axes. Similarly, $m_{Rax}$, $m_{Ray}$, and $m_{Raz}$ represent projections of a unit vector $\hat{m}_{Ra}$ that is in the direction of the 'a' receiver moment on the x, y, and z coordinate axes; $m_{Rbx}$, $m_{Rby}$, and $m_{Rbz}$ represent projections of a unit vector $\hat{m}_{Rb}$ that is in the direction of the 'b' receiver moment on the x, y, and z coordinate axes; and $m_{Rcx}$, $m_{Rcy}$, and $m_{Rcz}$ represent projections of a unit vector $\hat{m}_{Rc}$ that is in the direction of the 'c' receiver moment on the x, y, and z coordinate axes.

The transfer impedance tensor, Z, is a function of the subterranean formation properties, for example, as expressed below:

$$Z = f(\sigma_h, \sigma_v, \in_h, \in_v, L, \text{dip angle, dip azimuth angle, bed thickness}) \quad (9)$$

where $\sigma_h$ represents the horizontal conductivity, $\sigma_v$ represents the vertical conductivity, $\in_h$ represents the horizontal dielectric constant, $\in_v$ represents the vertical dielectric constant, and L represents the distance to a remote bed. The apparent dip angle is generally defined as the angle between and the tool axis and the normal vector of the bed. The apparent dip azimuth angle is generally defined as the angle between the xz plane of the tool and the horizontal component of the bed normal vector. A bed boundary is defined by two adjacent beds with different conductivities.

Figure 3:
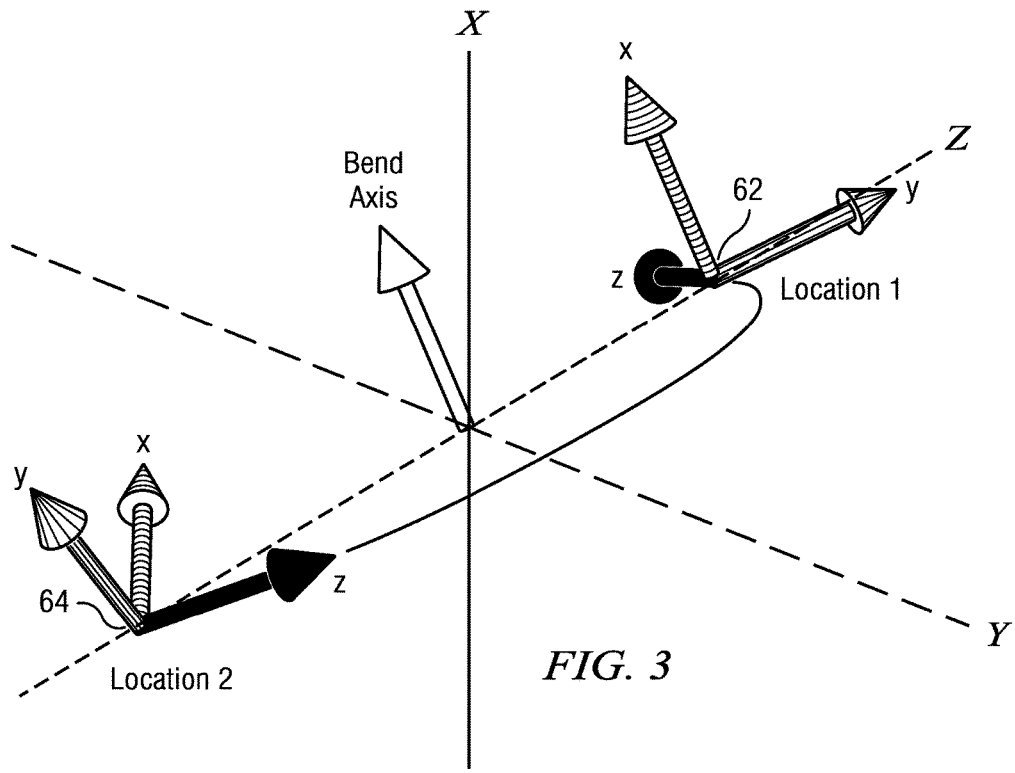
FIG. 3 depicts a transmitter receiver pair deployed in an arbitrary global X, Y, Z reference frame.

FIG. 3 depicts a transmitter receiver pair deployed in an arbitrary global X, Y, Z reference frame. Local x, y, z reference frames are depicted at each of the transmitter and receiver locations. In the depicted example, transmitter T1 is deployed on a first sub 62 and R1 is deployed on a second sub 64 such that BHA makeup (axial rotation) and bending (cross axial rotation) may rotate the transmitter and receiver triads (as well as the local reference frames) with respect to one another. In the following analysis, BHA makeup and bending are considered sequentially (although the disclosed embodiments are not limited in this regard). The tool is first considered to be unbent and aligned with the global Z axis. Since the rotational orientation of each sub may be considered to be random, the transmitter and receiver moments may be rotated about their corresponding local z axis, for example, as follows:

$$R_{z\alpha}m_R \text{ and } R_{z\gamma}m_T$$

where $R_{z\alpha}$ represents the rotation matrix of an axial rotation about angle $\alpha$, $R_{z\gamma}$ represents the rotation matrix of an axial rotation about angle $\gamma$, and $m_R$ and $m_T$ are matrices representing the magnetic moments of the receiver and transmitter triads. After the axial rotations given above, the angular offset between the local x, y, z reference frames may be given as $\gamma - \alpha$. Tool bending may then be considered as a separate rotation about an arbitrary cross axial rotation axis, for example, as follows:

$$\acute{m}_R = R_{Rbend} R_{z\alpha} m_R = R_R m_R$$

$$\acute{m}_T = R_{Tbend} R_{z\gamma} m_T = R_T m_T \quad (10)$$

where $\acute{m}_R$ and $\acute{m}_T$ represent the rotated receiver and transmitter moments (rotated both axially and via a tool bend).

With reference again to FIG. 2C, a propagation tool may be considered having first and second transmitter triads and first and second receiver triads in which the magnetic moments of each transmitter and receiver are aligned along arbitrary linearly independent directions. By linearly independent, it is meant that none of the moment directions in the triad may be written as a linear combination of one or both of the other moment directions in the triad.

Voltages measured on the receiver R2 triad induced by currents in the transmitter T1 triad may be expressed as a 3×3 tensor, for example, as follows:

$$V_{12} = \begin{bmatrix} V_{12xx} & V_{12xy} & V_{12xz} \\ V_{12yx} & V_{12yy} & V_{12yz} \\ V_{12zx} & V_{12zy} & V_{12zz} \end{bmatrix} \quad (11)$$

As in Equations 7 and 8, the voltages $V_{12}$ may be expressed in terms of the electronic gains and rotated moments. Assuming no other coupling between the transmitter and receiver triads (i.e., that capacitive coupling, crosstalk, and noise are negligible) leads to the following tensor model:

$$V_{12} = G_{T1} m_{T1}{}^t Z_{12} m_{R2} G_{R2} = G'_{T1} Z_{12} G'_{R2} \quad (12)$$

Where $G_{T1}$ represents the transmitter gains, $G_{R2}$ represents the receiver gains, $m_{T1}{}^t$ represents the transpose of the unit vector projections of transmitter T1, $m_{R2}$ represents the unit vector projections of receiver R2, $G'_{T1} = G_{T1} m_{T1}{}^t$, and $G'_{R2} = m_{R2} G_{R2}$.

The gains from receiver R1 may be eliminated by taking the following combination of voltages and computing the quantity $M_{21}$, for example, as follows:

$$M_{21} = V_{11} V_{21}^{-1} = G'_{T1} Z_{11} G'_{R1} G'_{R1}{}^{-1} Z_{21}$$
$$G'_{T2}{}^{-1} = G'_{T1} Z_{11} Z_{21}^{-1} G'_{T2}{}^{-1} \quad (13)$$

It will be understood that Equation 13 assumes that $G_{T2}$ and $G_{R1}$ are invertible. These generalized gain matrices are each products of a diagonal gain matrix, a rotation matrix (for which the transpose is its inverse), and the moment matrix. Since the diagonal gain matrix and rotation matrices are invertible, invertibility of $G'_{T2}$ and $G'_{R1}$ depends on the invertibility of $m_{T2}$ and $m_{R1}$. The gains from receiver R2 may be similarly eliminated by computing the quantity $M_{12}$, for example, as follows:

$$M_{12} = V_{22} V_{12}{}^{-1} = G'_{T2} Z_{22} G'_{R2} G'_{R2}{}^{-1} Z_{12}$$
$$G'_{T1}{}^{-1} = G'_{T2} Z_{22} Z_{12}{}^{-1} G'_{T1}{}^{-1} \qquad (14)$$

Equation 14 assumes that $G_{T1}$ and $G_{R2}$ are invertible along with $m_{T1}$ and $m_{R2}$. Combining $M_{21}$ and $M_{12}$, for example, as follows results in a quantity $\mathcal{M}_{21}$ that depends only on the generalized gains of the transmitter T1.

$$\mathcal{M}_{21} = M_{21} M_{12} = G'_{T1} Z_{11} Z_{21}^{-1} G'^{-1}_{T2} G'_{T2} Z_{22} Z_{12}^{-1} G'^{-1}_{T1} = G'_{T1} U_{21} G'^{-1}_{T1} \qquad (15)$$
$$= G_{T1} m^t_{T1} R^t_{T1} U_{21} R_{T1} m_{T1}^{-t} G_{T1}^{-1} = G_{T1} m^t_{T1} U'_{21} m_{T1}^{-t} G_{T1}^{-1}$$

Note that in the quantity $\mathcal{M}_{21}$ all receiver gains have been removed (e.g., only the transmitter T1 gains remain). Moreover, since $U'_{21} = R_{T1}{}^t U_{21} R_{T1}$ is the rotation of $U_{21}$ from the global reference frame to the local T1 reference frame, $\mathcal{M}_{21}$ only depends on the gains and moment directions at the location of the T1 transmitter. It is independent of the gains, moment directions, and orientations (including bending and alignment) of the other transmitter and receiver triads.

Similarly, $M_{21}$ and $M_{12}$ may also be combined, for example, to obtain a quantity $\mathcal{M}_{12}$ that depends only on the generalized gains of the transmitter T2.

$$\mathcal{M}_{12} = M_{12} M_{21} = G'_{T2} Z_{22} Z_{12}^{-1} G'^{-1}_{T1} G'_{T1} Z_{11} Z_{21}^{-1} G'^{-1}_{T2} = G'_{T2} U_{12} G'^{-1}_{T2} \qquad (16)$$
$$= G_{T2} m^t_{T2} R^t_{T2} U_{12} R_{T2} m_{T2}^{-t} G_{T2}^{-1} = G_{T2} m^t_{T2} U'_{12} m_{T2}^{-t} G_{T2}^{-1}$$

Note that in the quantity $\mathcal{M}_{12}$ all receiver gains have been removed (e.g., only the transmitter T2 gains remain). Moreover, the resulting quantity $\mathcal{M}_{12}$ only depends on the gains and moment directions at the location of the T1 transmitter. It is independent of the gains, moment directions, and orientations (including bending and alignment) of the other transmitter and receiver triads. Other expressions may be obtained by changing the order of the individual terms so that similar quantities are obtained depending only on the receiver R1 and R2 gains and rotations.

Consider now the special case in which the moments of the a, b, and c transmitter coils of T1 are aligned with the x, y, and z axes. In this special case, the gain matrices are diagonal and the tensor quantity $\mathcal{M}_{21}$ may be expressed as follows:

$$\mathcal{M}_{21} = \begin{bmatrix} U_{21xx} & \frac{g_{T1a}}{g_{T1b}} U_{21xy} & \frac{g_{T1a}}{g_{T1c}} U_{21xz} \\ \frac{g_{T1b}}{g_{T1a}} U_{21yx} & U_{21yy} & \frac{g_{T1b}}{g_{T1c}} U_{21yz} \\ \frac{g_{T1c}}{g_{T1a}} U_{21zx} & \frac{g_{T1c}}{g_{T1b}} U_{21zy} & U_{21zz} \end{bmatrix} \qquad (17)$$

Note that the diagonal terms of $\mathcal{M}_{21}$ are fully gain compensated while the cross terms are dependent on certain ratios of the transmitter gains on transmitter T1. Each of the tensor terms is also dependent on the rotation at the location of the T1 transmitter since $U'_{21} = R_{T1}{}^t U_{21} R_{T1}$ (see Equation 15). Taking the generalization of the standard case further, the phase shift and attenuation of $\mathcal{M}_{21}$ may further be computed. To find the natural logarithm of $\mathcal{M}_{21}$ the matrix is first diagonalized, for example, as follows:

$$\mathcal{M}'_{21} = P^{-1} \mathcal{M}_{21} P \qquad (18)$$

where P is a matrix of eigenvectors of $\mathcal{M}_{21}$ (each column of P is an eigenvector of $M_{21}$) and $\mathcal{M}'_{21}$ is a diagonal matrix whose diagonal elements are eigenvalues of $\mathcal{M}_{21}$. Replacing each diagonal element of $\mathcal{M}'_{21}$ by its natural log to obtain ln($\mathcal{M}'_{21}$) yields:

$$\ln(\mathcal{M}_{21}) = P \mathcal{M}'_{21} P^{-1} \qquad (19)$$

The phase shift and attenuation may then be expressed as follows:

$$PS_{21} = \frac{180}{\pi} \mathrm{Im}[\ln(\mathcal{M}_{21})] \qquad (20)$$

$$AD_{21} = \frac{20}{\log(10)} \mathrm{Re}[\ln(\mathcal{M}_{21})] \qquad (21)$$

where the phase shift $PS_{21}$ is given in degrees, the attenuation $AD_{21}$ is given in decibels, Im[ln($\mathcal{M}_{21}$)] represents the imaginary portion of ln($\mathcal{M}_{21}$), and Re[ln($\mathcal{M}_{21}$)] represents the real portion of ln($\mathcal{M}_{21}$).

It will be understood that the phase shift and attenuation tensors given in Equations 20 and 21 have a similar form to the tensor quantity $\mathcal{M}_{21}$ given in Equation 17 in that the diagonal elements are gain compensated and that the off diagonal elements (the cross terms) are equal to the gain compensated cross term multiplied by a gain ratio. The remaining gain error on each of the cross terms tends to be small (fractional) since each gain error is a ratio of the two transmitter gains. As a result, when employing the presently disclosed techniques, gain calibrations do not have to be as stringent as when compared to the prior art.

BHA Bending and Rotation

Figure 4:
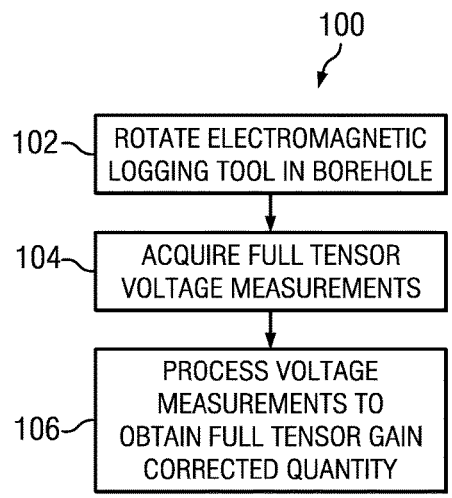
FIG. 4 depicts a flow chart of a disclosed method embodiment.

FIG. 4 depicts a flow chart of one example method embodiment 100 for obtaining a full tensor gain compensated propagation measurement. An electromagnetic logging tool is rotated in a subterranean borehole at 102. The logging tool includes at least first and second axially spaced transmitters and at least first and second axially spaced receivers, each of the transmitters and each of the receivers including a set of three collocated, linearly independent antenna moments. At least one of the transmitters and/or receivers is non-triaxial. A plurality of full tensor voltage measurements is acquired at 104 while rotating at 102. The full tensor voltage measurements are obtained from a corresponding plurality of pairs of the transmitters and receivers. A processor, such as a downhole processor, processes the full tensor voltage measurements to obtain a partially gain compensated full tensor quantity at 106. As shown in the examples above and further below, a partially gain compensated full tensor (e.g., nine terms) may refer to one in which some of the tensor terms are fully gain compensated (e.g., diagonal terms in Equation 17), and some are not fully gain compensated (e.g., the cross terms of Equation 17 are dependent on certain ratios of the transmitter gains).

In logging while drilling operations, measurements are made while the logging tool rotates in the borehole. Such rotation may be included in the foregoing model. Consider a first transmitter receiver pair. Rotation of the drill string causes the logging tool to rotate about its z-axis such that the transmitter and receiver moments each rotate through a common angle θ about their local z-axis. Moreover, during directional drilling operations, the drill string typically bends to accommodate the changing borehole direction. Following Equation 10, the transmitter and receiver moments may be expressed as follows taking into account drill string rotation, bending, and relative rotation of the transmitter with respect to the receiver.

$$\acute{m}_{R\_rot}=R_{R\_BHA\_rot}\acute{m}_R=R_{R\_BHA\_rot}R_{Rbend}R_{z\alpha}m_R$$

$$\acute{m}_{T\_rot}=R_{T\_BHA\_rot}\acute{m}_T=R_{T\_BHA\_rot}R_{Tbend}R_{z\gamma}m_T \quad (22)$$

where $\acute{m}_{R\_rot}$ and $\acute{e}_{T\_rot}$ represent the receiver and transmitter moments after drill string rotation and $R_{R\_BHA\_rot}$ and $R_{T\_BHA\_rot}$ represent the rotation matrices that rotate the receiver and transmitter moments about their respective tool axes (which are rotated with respect to one another owing to relative axial rotation BHA bending). Again, consider the case in which the moments of the a, b, and c antenna are aligned with the x, y, and z axes:

$$\acute{m}_{R\_rot\_a}=R_{R\_BHA\_rot}\acute{m}_{Ra}=\acute{m}_{Ra}\cos(\theta)+\acute{m}_{Rb}\sin(\theta) \quad (23)$$

$$\acute{m}_{R\_rot\_b}=R_{R\_BHA\_rot}\acute{m}_{Rb}=-\acute{m}_{Ra}\sin(\theta)+\acute{m}_{Rb}\cos(\theta)$$

$$\acute{m}_{R\_rot\_c}=R_{R\_BHA\_rot}\acute{m}_{Rc}=\acute{m}_{Rc}$$

$$\acute{m}_{T\_rot\_a}=R_{T\_BHA\_rot}\acute{m}_{Ta}=\acute{m}_{Ta}\cos(\theta)+\acute{m}_{Tb}\sin(\theta)$$

$$\acute{m}_{T\_rot\_b}=R_{T\_BHA\_rot}\acute{m}_{Tb}=-\acute{m}_{Ta}\sin(\theta)+\acute{m}_{Tb}\cos(\theta)$$

$$\acute{m}_{T\_rot\_c}=R_{T\_BHA\_rot}\acute{m}_{Tc}=\acute{m}_{Tc} \quad (24)$$

The voltage tensor $V_{TR}(\theta)$ measured at any rotation angle θ may be expressed, for example, as follows:

$$V_{TR}(\theta)=G_T(\acute{m}_{T_{rot}}(\theta))^t Z \acute{m}_{R_{rot}}(\theta) G_R \quad (25)$$

Following Equation 25, the voltage tensor $V_{TR}(0)$, at angle θ=0, may be expressed as follows:

$$V_{TR}(0) = G_T \acute{m}_T^t Z \acute{m}_R G_R \quad (26)$$

$$= \begin{bmatrix} g_{Ta} & 0 & 0 \\ 0 & g_{Tb} & 0 \\ 0 & 0 & g_{Tc} \end{bmatrix} \begin{bmatrix} \acute{m}_{Tax} & \acute{m}_{Tbx} & \acute{m}_{Tcx} \\ \acute{m}_{Tay} & \acute{m}_{Tby} & \acute{m}_{Tcy} \\ \acute{m}_{Taz} & \acute{m}_{Tbz} & \acute{m}_{Tcz} \end{bmatrix}^t$$

$$Z \begin{bmatrix} \acute{m}_{Rax} & \acute{m}_{Rbx} & \acute{m}_{Rcx} \\ \acute{m}_{Ray} & \acute{m}_{Rby} & \acute{m}_{Rcy} \\ \acute{m}_{Raz} & \acute{m}_{Rbz} & \acute{m}_{Rcz} \end{bmatrix} \begin{bmatrix} g_{Ra} & 0 & 0 \\ 0 & g_{Rb} & 0 \\ 0 & 0 & g_{Rc} \end{bmatrix}$$

$$= \begin{bmatrix} g_{Ta}g_{Ta}\acute{m}_{Ta}^t Z\acute{m}_{Ra} & g_{Ta}g_{Rb}\acute{m}_{Ta}^t Z\acute{m}_{Rb} & g_{Ta}g_{Rc}\acute{m}_{Ta}^t Z\acute{m}_{Rc} \\ g_{Tb}g_{Ta}\acute{m}_{Tb}^t Z\acute{m}_{Ra} & g_{Tb}g_{Rb}\acute{m}_{Tb}^t Z\acute{m}_{Rb} & g_{Tb}g_{Rc}\acute{m}_{Tb}^t Z\acute{m}_{Rc} \\ g_{Tc}g_{Ta}\acute{m}_{Tc}^t Z\acute{m}_{Ra} & g_{Tc}g_{Rb}\acute{m}_{Tc}^t Z\acute{m}_{Rb} & g_{Tc}g_{Rc}\acute{m}_{Tc}^t Z\acute{m}_{Rc} \end{bmatrix}$$

Rotating the BHA one quarter turn to $$\theta = \frac{\pi}{2}$$

rotates the a antenna to a direction at which the b antenna was pointing at θ=0 and rotates the b antenna to a direction opposite that the direction at which the a antenna was pointing at θ=0. The direction of the c antenna remains unchanged (as it is coincident with the rotation axis of the BHA). Following Equation 25, the voltage tensor $$V_{TR}\left(\frac{\pi}{2}\right)$$

may be expressed as follows:

$$V_{TR}\left(\frac{\pi}{2}\right) = \quad (27)$$

$$G_T \acute{m}_T\left(\frac{\pi}{2}\right)^t Z \acute{m}_R\left(\frac{\pi}{2}\right) G_R = \begin{bmatrix} g_{Ta} & 0 & 0 \\ 0 & g_{Tb} & 0 \\ 0 & 0 & g_{Tc} \end{bmatrix} \begin{bmatrix} \acute{m}_{Tbx} & -\acute{m}_{Tax} & \acute{m}_{Tcx} \\ \acute{m}_{Tby} & -\acute{m}_{Tay} & \acute{m}_{Tcy} \\ \acute{m}_{Tbz} & -\acute{m}_{Taz} & \acute{m}_{Tcz} \end{bmatrix}^t$$

$$Z \begin{bmatrix} \acute{m}_{Rbx} & -\acute{m}_{Rax} & \acute{m}_{Rcx} \\ \acute{m}_{Rby} & -\acute{m}_{Ray} & \acute{m}_{Rcy} \\ \acute{m}_{Rbz} & -\acute{m}_{Raz} & \acute{m}_{Rcz} \end{bmatrix} \begin{bmatrix} g_{Ra} & 0 & 0 \\ 0 & g_{Rb} & 0 \\ 0 & 0 & g_{Rc} \end{bmatrix} =$$

$$\begin{bmatrix} g_{Ta}g_{Ta}\acute{m}_{Tb}^t Z\acute{m}_{Rb} & -g_{Ta}g_{Rb}\acute{m}_{Tb}^t Z\acute{m}_{Ra} & g_{Ta}g_{Rc}\acute{m}_{Ta}^t Z\acute{m}_{Rc} \\ -g_{Tb}g_{Ta}\acute{m}_{Ta}^t Z\acute{m}_{Rb} & g_{Tb}g_{Rb}\acute{m}_{Ta}^t Z\acute{m}_{Ra} & -g_{Tb}g_{Rc}\acute{m}_{Tb}^t Z\acute{m}_{Rc} \\ g_{Tc}g_{Ta}\acute{m}_{Tc}^t Z\acute{m}_{Rb} & -g_{Tc}g_{Rb}\acute{m}_{Tc}^t Z\acute{m}_{Ra} & g_{Tc}g_{Rc}\acute{m}_{Tc}^t Z\acute{m}_{Rc} \end{bmatrix}$$

Taking the compensated combinations as in Equations 15 and 16 gives similar results:

$$\mathcal{M}_{12}(0) = \begin{bmatrix} \acute{U}_{12xx} & \frac{g_{T1a}}{g_{T1b}}\acute{U}_{12xy} & \frac{g_{T1a}}{g_{T1c}}\acute{U}_{12xz} \\ \frac{g_{T1b}}{g_{T1a}}\acute{U}_{12yx} & \acute{U}_{12yy} & \frac{g_{T1b}}{g_{T1c}}\acute{U}_{12yz} \\ \frac{g_{T1c}}{g_{T1a}}\acute{U}_{12zx} & \frac{g_{T1c}}{g_{T1b}}\acute{U}_{12zy} & \acute{U}_{12zz} \end{bmatrix} \quad (28)$$

where $\mathcal{M}_{12}(0)$ represents the quantity $\mathcal{M}_{12}$ at θ=0. A similar combination may be obtained at $$\theta = \frac{\pi}{2}$$

and then mathematically rotating the results by −90 degrees.

$$\begin{bmatrix} 0 & -1 & 0 \\ 1 & 0 & 0 \\ 0 & 0 & 1 \end{bmatrix} \mathcal{M}_{12}\left(\frac{\pi}{2}\right) \begin{bmatrix} 0 & 1 & 0 \\ -1 & 0 & 0 \\ 0 & 0 & 1 \end{bmatrix} = \quad (29)$$

$$\begin{bmatrix} \acute{U}_{12xx} & \frac{g_{T1b}}{g_{T1a}}\acute{U}_{12xy} & \frac{g_{T1b}}{g_{T1c}}\acute{U}_{12xz} \\ \frac{g_{T1a}}{g_{T1b}}\acute{U}_{12yx} & \acute{U}_{12yy} & \frac{g_{T1a}}{g_{T1c}}\acute{U}_{12yz} \\ \frac{g_{T1c}}{g_{T1b}}\acute{U}_{12zx} & \frac{g_{T1c}}{g_{T1a}}\acute{U}_{12zy} & \acute{U}_{12zz} \end{bmatrix}$$

Note that Equation 29 is similar to Equation 28 except that a $g_{T1a}$ and $g_{T1b}$ have traded places. In principle, multiplying the xy and yx terms in Equations 28 and 29 may be used to eliminate the gain in these terms. However, such an approach does not eliminate the gain in the cross terms involving the c antenna (i.e., the xz, zx, yz, and zy terms).

Compensation Using BHA Rotation and Tilted Antennas

Figure 5:
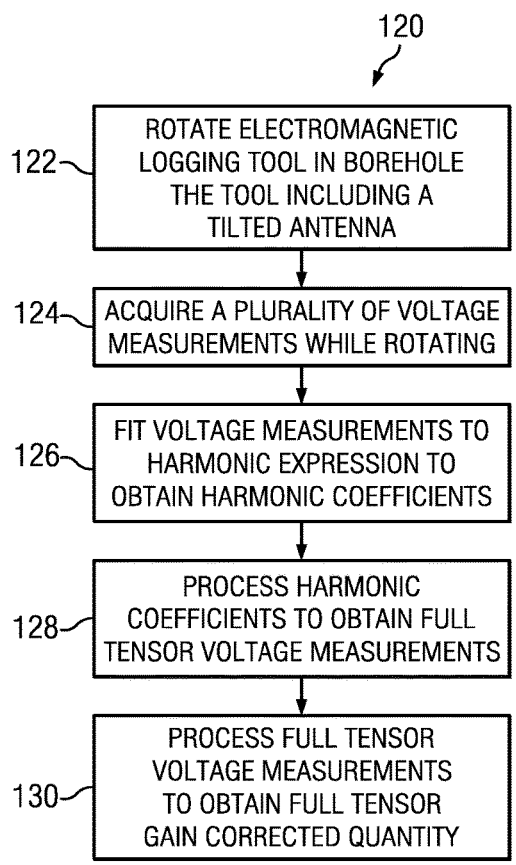
FIG. 5 depicts a flow chart of another disclosed method embodiment.

FIG. 5 depicts a flow chart of another example method embodiment 120 for obtaining a full tensor gain compensated propagation measurement. An electromagnetic logging tool is rotated in a subterranean borehole at 122. The logging tool includes at least first and second axially spaced transmitters and at least first and second axially spaced receivers. Each of the receivers includes a set of collocated linearly independent antennas. Each of the transmitters includes first and second collocated antennas, at least the first transmitter antenna having a tilted moment with respect to a longitudinal axis of the tool. A plurality voltage measurements is acquired at 124 while rotating the tool at 122. The plurality of voltage measurements is obtained using a corresponding plurality of pairs of the transmitters and receivers. The voltage measurements are fit to a harmonic expression at 126 to obtain harmonic coefficients. The harmonic coefficients are processed at 128 to construct a full tensor voltage measurement. The full tensor voltage measurement is further processed at 130 to obtain a fully gain compensated tensor quantity.

Figure 6:
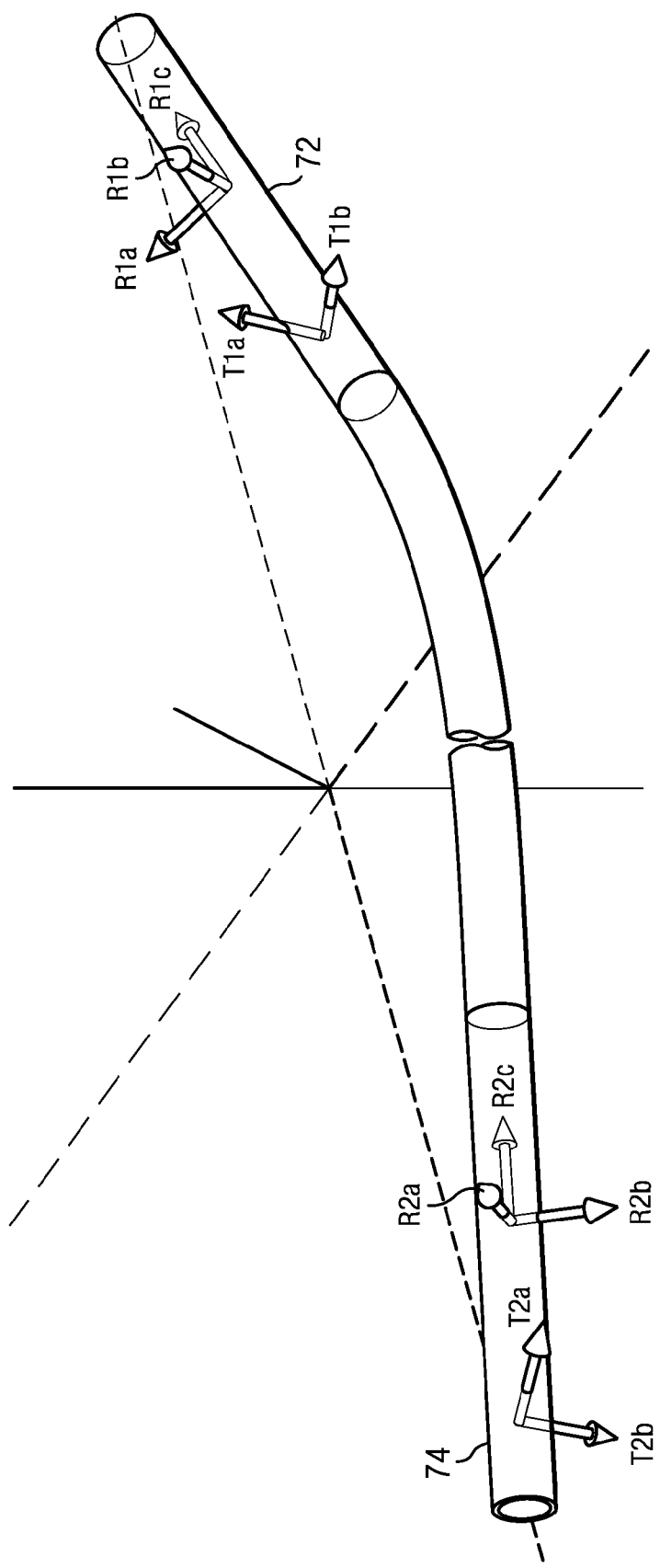
FIG. 6 schematically depicts an electromagnetic logging tool suitable for use with the method embodiment depicted on FIG. 5.

FIG. 6 depicts another embodiment of a tool configuration including a tilted transmitter arrangement. The depicted tool configuration includes first and second subs 72 and 74 as described above with respect to FIG. 3. First and second receivers are deployed on the corresponding subs. Each receiver includes a set of collocated linearly independent antennas (referred to herein as a receiver triad). First and second transmitters (T1 and T2) each of which includes an a antenna having a moment tilted with respect to the tool axis and a b antenna having a moment perpendicular to the tool axis are also deployed on the corresponding subs as depicted. The moment of the a antenna is tilted at an angle $\beta$ with respect to the tool axis.

While FIG. 6 depicts first and second subs 72 and 74, each including a corresponding transmitter and a receiver, it will be understood that the disclosed embodiments are not limited to any particular collar configuration. For example, each of the transmitters and receivers may be deployed on distinct subs. In other embodiments, both transmitters and receivers may be deployed on a single sub.

It will be further understood, according to the principle of reciprocity, that the transmitting and receiving antennas may operate as either a transmitter or a receiver when coupled with the appropriate transmitter and/or receiver electronics such that the transmitters and receivers may be swapped without affecting the gain compensation methodology that follows. Therefore, in the embodiment depicted on FIG. 6, the transmitters T1 and T2 may be swapped with the receivers R1 and R2 such that each transmitter includes a set of collocated linearly independent antennas and each receiver includes an a antenna having a moment tilted with respect to the tool axis.

The moment $\acute{m}_{Ta}$ of the a transmitter may be decomposed into moments parallel and perpendicular to the tool axis direction $\hat{u}_T$, for example, as follows:

$$\acute{m}_{Ta} = (\acute{m}_{Ta} - (\acute{m}_{Ta} \cdot \hat{u}_T)) + (\acute{m}_{Ta} \cdot \hat{u}_T) \ \hat{u}_T = \sin(\beta)$$
$$\acute{m}_{Ta\_perp} + \cos(\beta) \hat{u}_T \quad (30)$$

where $\acute{m}_{Ta\_perp}$ represents the component of the a transmitter antenna that is orthogonal to the tool axis $\hat{u}_T$.

As described above, rotation of the drill string causes the logging tool to rotate about its z-axis such that the transmitter and receiver moments each rotate through a common angle $\theta$ about their local z-axis. The transmitter and receiver moments may be expressed as functions of the angle $\theta$, for example, as follows:

$$\acute{m}_{T\_rot\_a} = R_{T\_BHA\_rot} \acute{m}_{Ta} = \sin(\beta)(\acute{m}_{T\_perp} \cos(\theta) + \acute{m}_{Tb} \sin(\theta)) + \cos(\beta) \hat{u}_T$$

$$\acute{m}_{T\_rot\_b} = R_{T\_BHA\_rot} \acute{m}_{Tb} = -\sin(\beta) \acute{m}_{Ta\_perp} \sin(\theta) + \acute{m}_{Tb} \cos(\theta) \quad (31)$$

$$\acute{m}_{R\_rot\_a} = R_{R\_BHA\_rot} \acute{m}_{Ra} = \acute{m}_{Ra} \cos(\theta) + \acute{m}_{Rb} \sin(\theta)$$

$$\acute{m}_{R\_rot\_b} = R_{R\_BHA\_rot} \acute{m}_{Rb} = -\acute{m}_{Ra} \sin(\theta) + \acute{m}_{Rb} \cos(\theta)$$

$$\acute{m}_{R\_rot\_c} = R_{R\_BHA\_rot} \acute{m}_{Rc} = \acute{m}_{Rc} \quad (32)$$

where $\acute{m}_{T\_rot\_a}$ and $\acute{m}_{T\_rot\_b}$ represent the a and b transmitter moments with rotation and $\acute{m}_{R\_rot\_a}$, $\acute{m}_{R\_rot\_b}$, and $\acute{m}_{R\_rot\_c}$ represent the a, b, and c receiver moments.

The voltage $V_{TR}(\theta)$ measured for any particular transmitter receiver pair may be expressed as given above in Equation 25 where the transmitter gain matrix $G_T$ is given as follows:

$$G_T = \begin{bmatrix} g_{Ta}\sin(\beta) & 0 & 0 \\ 0 & g_{Tb} & 0 \\ 0 & 0 & g_{Ta}\cos(\beta) \end{bmatrix} \quad (33)$$

The voltage $V_{TR}(\theta)$ may further be expressed in harmonic form, for example, as follows:

$$V_{TR}(\theta) = V_{TR\_DC} + V_{TR\_FHC} \cos(\theta) + V_{TR\_FHS} \sin(\theta) + \ldots V_{TR\_SHC} \cos(2\theta) + V_{TR\_SHS} \sin(2\theta) \quad (34)$$

wherein $V_{TR\_DC}$ represents the DC (or average), $V_{TR\_FHC}$ and $V_{TR\_FHS}$ represent the first harmonic cosine and sine, and $V_{TR\_SHC}$ and $V_{TR\_SHS}$ represent the second harmonic cosine and sine. For the tilted a transmitter antenna, the DC, second harmonic cosine, and second harmonic sine terms are dependent on $\acute{m}_{Ta\_perp}$ whereas the first harmonic cosine and first harmonic sine terms are dependent on $\hat{u}_T$. The harmonic terms may be obtained by fitting the measured voltages during rotation (as a function of tool face angle) to Equation 34. The contributions of the moment of transmitter antenna a that are parallel and perpendicular to the tool may be separated from one another using the harmonic terms. For example, $$V_{TaRa\_FHC} = g_{Ta} g_{Ra} \cos(\beta) \hat{u}_T^t Z \acute{m}_{Ra}$$

$$V_{TaRa\_FHS} = g_{Ta} g_{Ra} \cos(\beta) \hat{u}_T^t Z \acute{m}_{Rb} \quad (35)$$

A full three dimensional voltage tensor may then be obtained by fitting each of the rotation dependent voltage measurements $V_{TaRa}(\theta)$, $V_{TaRb}(\theta)$, $V_{TaRc}(\theta)$, $V_{TbRa}(\theta)$, $V_{TbRb}(\theta)$, and $V_{TbRc}(\theta)$ to Equation 34 and solving for the corresponding harmonics. The harmonics may then be used to obtain the various voltage tensor terms. Following the procedure described above with respect to Equations 26 and 27, the voltage tensor $V_{TR}(0)$, at angle $\theta=0$, may be constructed from the following combination of measured voltage harmonics:

$$V_{TR}(0) = \begin{bmatrix} V_{TaRa\_DC} + & V_{TaRb\_DC} + & V_{TaRc\_FHC} \\ V_{TaRa\_SHC} & V_{TaRb\_SHC} & \\ V_{TbRa\_DC} + & V_{TbRb\_DC} + & V_{TcRc\_FHC} \\ V_{TaRa\_SHC} & V_{TbRb\_SHC} & \\ V_{TaRa\_FHC} & V_{TaRb\_FHC} & V_{TaRc\_DC} \end{bmatrix} = \quad (37)$$

$$\begin{bmatrix} \sin(\beta) g_{Ta} g_{Ra} \hat{m}^t_{Ta\_perp} Z \hat{m}_{Ra} & \sin(\beta) g_{Ta} g_{Rb} \hat{m}^t_{Ta\_perp} Z \hat{m}_{Rb} & \sin(\beta) g_{Ta} g_{Rc} \hat{m}^t_{Ta\_perp} Z \hat{m}_{Rc} \\ g_{Tb} g_{Ra} \hat{m}^t_{Tb\_perp} Z \hat{m}_{Ra} & g_{Tb} g_{Rb} \hat{m}^t_{Tb\_perp} Z \hat{m}_{Rb} & g_{Tb} g_{Rc} \hat{m}^t_{Tb\_perp} Z \hat{m}_{Rc} \\ \cos(\beta) g_{Ta} g_{Ra} \hat{u}^t_T Z \hat{m}_{Ra} & \cos(\beta) g_{Ta} g_{Rb} \hat{u}^t_T Z \hat{m}_{Rb} & \cos(\beta) g_{Ta} g_{Rc} \hat{u}^t_T Z \hat{m}_{Rc} \end{bmatrix}$$

Inspection of the last expression in Equation 37 reveals that it is equal to Equation 27 with the equivalent transmitter gains given in Equation 33. Similarly, the voltage tensor $$V_{TR}\left(\frac{\pi}{2}\right),$$

at angle $$\theta = \frac{\pi}{2},$$

may be expressed as follows:

$$V_{TR}\left(\frac{\pi}{2}\right) = \begin{bmatrix} V_{TaRa\_DC} - & V_{TaRb\_DC} - & V_{TaRc\_FHS} \\ V_{TaRa\_SHC} & V_{TaRb\_SHC} & \\ V_{TbRa\_DC} - & V_{TbRb\_DC} - & V_{TcRc\_FHS} \\ V_{TaRa\_SHC} & V_{TbRb\_SHC} & \\ V_{TaRa\_FHS} & V_{TaRb\_FHS} & V_{TaRc\_DC} \end{bmatrix} = \quad (38)$$

$$\begin{bmatrix} \sin(\beta) g_{Ta} g_{Ta} \hat{m}^t_{Tb} Z \hat{m}_{Rb} & -\sin(\beta) g_{Ta} g_{Rb} \hat{m}^t_{Tb} Z \hat{m}_{Ra} & \sin(\beta) g_{Ta} g_{Rc} \hat{m}^t_{Tb} Z \hat{m}_{Rc} \\ -g_{Tb} g_{Ta} \hat{m}^t_{Ta} Z \hat{m}_{Rb} & g_{Tb} g_{Rb} \hat{m}^t_{Ta} Z \hat{m}_{Ra} & -g_{Tb} g_{Rc} \hat{m}^t_{Ta} Z \hat{m}_{Rc} \\ \cos(\beta) g_{Tc} g_{Ta} \hat{m}^t_{Tc} Z \hat{m}_{Rb} & -\cos(\beta) g_{Tc} g_{Rb} \hat{m}^t_{Tc} Z \hat{m}_{Ra} & \cos(\beta) g_{Tc} g_{Rc} \hat{m}^t_{Tc} Z \hat{m}_{Rc} \end{bmatrix}$$

The quantity $\mathcal{M}_{12}(0)$ may be computed, for example, as described above with respect to Equation 28.

$$\mathcal{M}_{12}(0) = \quad (39)$$

$$\begin{bmatrix} \acute{U}_{12xx} & \sin(\beta_{T1}) \frac{g_{T1a}}{g_{T1b}} \acute{U}_{12xy} & \tan(\beta_{T1}) \acute{U}_{12xz} \\ \frac{1}{\sin(\beta_{T1})} \frac{g_{T1b}}{g_{T1a}} \acute{U}_{12yx} & \acute{U}_{12yy} & \frac{1}{\cos(\beta_{T1})} \frac{g_{T1b}}{g_{T1a}} \acute{U}_{12yz} \\ \cot(\beta_{T1}) \acute{U}_{12zx} & \cos(\beta_{T1}) \frac{g_{T1a}}{g_{T1b}} \acute{U}_{12zy} & \acute{U}_{12zz} \end{bmatrix}$$

The tensor quantity $\mathcal{M}_{12}(0)$ includes five (out of nine) fully compensated tensor terms with the y-axis cross terms including a ratio of the tilted transmitter gains. Likewise, following Equation 29, a similar combination may be obtained at $$\theta = \frac{\pi}{2}$$

and then mathematically rotating the results by −90 degrees.

$$\acute{\mathcal{M}}_{12}\left(\frac{\pi}{2}\right) = \begin{bmatrix} 0 & -1 & 0 \\ 1 & 0 & 0 \\ 0 & 0 & 1 \end{bmatrix} \mathcal{M}_{12}\left(\frac{\pi}{2}\right) \begin{bmatrix} 0 & 1 & 0 \\ -1 & 0 & 0 \\ 0 & 0 & 1 \end{bmatrix} = \quad (40)$$

$$\begin{bmatrix} \acute{U}_{12xx} & \frac{1}{\sin(\beta_{T1})} \frac{g_{T1b}}{g_{T1a}} \acute{U}_{12xy} & \frac{1}{\cos(\beta_{T1})} \frac{g_{T1b}}{g_{T1a}} \acute{U}_{12xz} \\ \sin(\beta_{T1}) \frac{g_{T1a}}{g_{T1b}} \acute{U}_{12yx} & \acute{U}_{12yy} & \tan(\beta_{T1}) \acute{U}_{12yz} \\ \cos(\beta_{T1}) \frac{g_{T1a}}{g_{T1b}} \acute{U}_{12zx} & \cos(\beta_{T1}) \acute{U}_{12zy} & \acute{U}_{12zz} \end{bmatrix}$$

The tensor quantity $$\acute{\mathcal{M}}_{12}\left(\frac{\pi}{2}\right)$$

includes five (out of nine) fully compensated tensor terms with the x-axis cross terms including a ratio of the tilted transmitter gains. It will be appreciated that the computed quantities $\mathcal{M}_{12}(0)$ and $$\mathcal{\check M}_{12}\!\left(\tfrac{\pi}{2}\right)$$

together contain sufficient information to compute a fully gain compensated tensor quantity (assuming that the tilt angle $\beta_{T1}$ is known). By fully gain compensated, it is meant that each of the nine tensor terms is compensated with respect to transmitter and receiver gains. The fully compensated quantity $\mathcal{M}_{12C}$ may be computed tensor term by tensor term from $\mathcal{M}_{12}(0)$ and $$\mathcal{\check M}_{12}\!\left(\tfrac{\pi}{2}\right),$$

for example, as follows:

$$\mathcal{M}_{12C} = \begin{bmatrix} \sqrt{\mathcal{M}_{12}(0)_{xx}\mathcal{\check M}_{12}\!\left(\tfrac{\pi}{2}\right)_{xx}} & \sqrt{\mathcal{M}_{12}(0)_{xy}\mathcal{\check M}_{12}\!\left(\tfrac{\pi}{2}\right)_{xy}} & \cot(\beta_{T1})\mathcal{M}_{12}(0)_{xz} \\ \sqrt{\mathcal{M}_{12}(0)_{yx}\mathcal{\check M}_{12}\!\left(\tfrac{\pi}{2}\right)_{yx}} & \sqrt{\mathcal{M}_{12}(0)_{yy}\mathcal{\check M}_{12}\!\left(\tfrac{\pi}{2}\right)_{yy}} & \cot(\beta_{T1})\mathcal{\check M}_{12}\!\left(\tfrac{\pi}{2}\right)_{yz} \\ \tan(\beta_{T1})\mathcal{M}_{12xz}(0) & \tan(\beta_{T1})\mathcal{\check M}_{12}\!\left(\tfrac{\pi}{2}\right)_{zy} & \sqrt{\mathcal{M}_{12}(0)_{zz}\mathcal{\check M}_{12}\!\left(\tfrac{\pi}{2}\right)_{zz}} \end{bmatrix} \quad (41)$$

which reduces to the following fully gain compensated tensor quantity:

$$\mathcal{M}_{12C} = \begin{bmatrix} \acute U_{12xx} & \acute U_{12xy} & \acute U_{12xz} \\ \acute U_{12yx} & \acute U_{12yy} & \acute U_{12yz} \\ \acute U_{12zx} & \acute U_{12zy} & \acute U_{12zz} \end{bmatrix} \quad (42)$$

While the fully gain compensated tensor quantity computed in Equation 41 has been described with respect to the antenna configuration depicted on FIG. 4, it will be understood that the disclosed methodology is not so limited. The disclosed methodology is more general and applied to collocated transmitter receiver combinations having arbitrary orientations so long as at least one antenna is tilted and the matrix made up of the moments is invertible. As described, axial rotation may be used to 'swap' antenna positions and to separate out the projection of the tilted antenna moments to form the equivalent of a triaxial antenna coupling. The matrix combination of two such transmitter receiver pairs results in a tensor quantity that depends only on the orientation of one colocated antenna set. Moreover, the transmitter and antenna roles may also be swapped and the same result obtained.

Compensation Using Calibration Antennas

A collocated transmitter (or receiver) having at least one tilted moment may be difficult to fabricate. Moreover, firing of a large number of transmitter antennas can lengthen the time it takes to acquire a given set of data. One alternative to the tilted antenna arrangement described above is to make use of a nearby set of calibration antennas to match some of the antenna gains.

Figure 7:
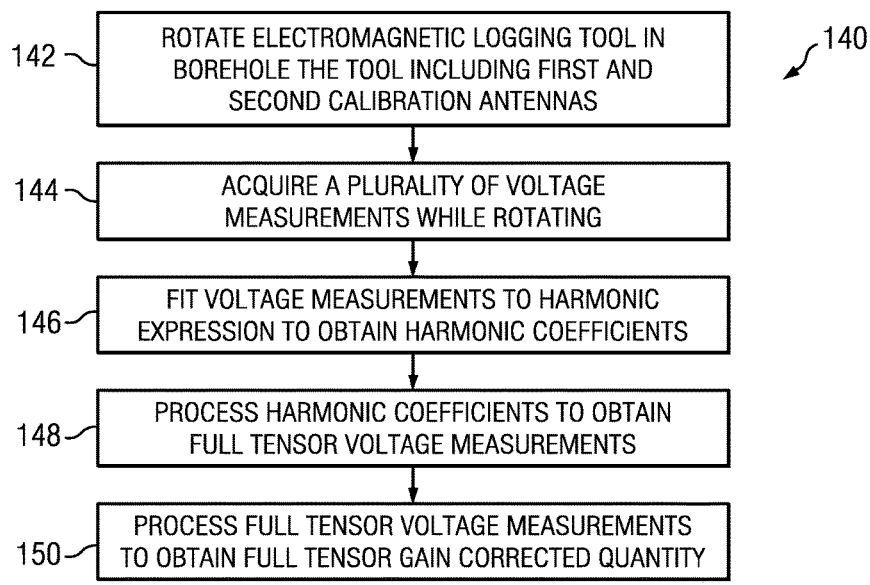
FIG. 7 depicts a flow chart of still another disclosed method embodiment.

FIG. 7 depicts a flow chart of still another example method embodiment 140 for obtaining a full tensor gain compensated propagation measurement. An electromagnetic logging tool is rotated in a subterranean borehole at 142. The logging tool includes first and second axially spaced tilted transmitters, first and second axially spaced calibration transmitters, and first and second axially spaced receivers. Each of the receivers includes a set of collocated linearly independent antennas. Each of the calibration transmitters includes first and second collocated calibration antennas having transverse moments with respect to one another and with respect to the longitudinal axis of the tool. Each of the tilted transmitters includes a tilted antenna not collocated with the corresponding calibration antennas and having a tilted moment with respect to a longitudinal axis of the tool. A plurality of voltage measurements is acquired at 144 while rotating the tool at 142. The plurality of voltage measurements is obtained using a corresponding plurality of pairs of the tilted transmitter antennas and the linearly independent receiver antennas. The voltage measurements are fit to a harmonic expression at 146 to obtain harmonic coefficients. The harmonic coefficients are processed at 148 to construct a full tensor voltage measurement which is in turn further processed at 150 to obtain a fully gain compensated tensor quantity.

Figure 8:
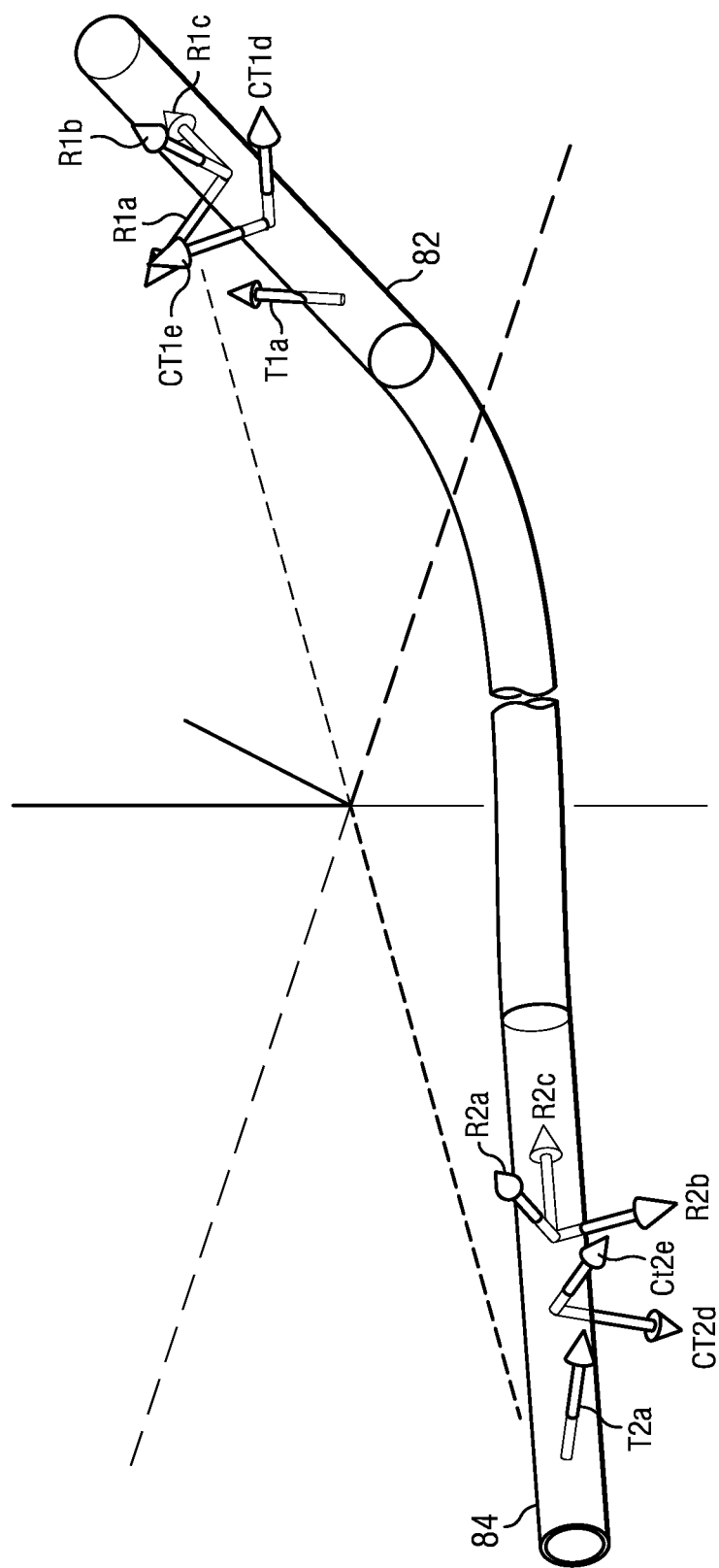
FIG. 8 schematically depicts an electromagnetic logging tool suitable for use with the method embodiment depicted on FIG. 7.

FIG. 8 depicts an embodiment of a downhole BHA configuration including first and second subs 82 and 84 (although the disclosed embodiments are by no means limited in this regard) that can be used in accordance with method 140 of FIG. 7. In the depicted embodiment, each sub includes a receiver R1 and R2, a calibration transmitter CT1 and CT2, and a "deep" tilted transmitter T1 and T2. On each sub, the receiver, calibration transmitter, and the tilted transmitter are axially spaced apart from one another. The receivers R1 and R2 include a set of collocated linearly independent antennas. The deep tilted transmitters T1 and T2 have large enough moments so that they may transmit a signal having sufficient strength to be received on the other sub and include an antenna having a moment tilted with respect to the longitudinal axis of the corresponding sub. The calibration transmitters CT1 and CT2 include first and second collocated, transverse calibration antennas that may be used to match the gains of the nearby a and b transverse receivers. The calibration antennas may be configured so that they generate sufficient signal strength so as to be received by the nearby receiver antennas (i.e., the receiver located on the same sub, but not receiver antennas on other subs). The calibration transmitters therefore need not be deep transmitters.

It will be understood, according to the principle of reciprocity, that the transmitting and receiving antennas may operate as either a transmitter or a receiver when coupled with the appropriate transmitter and/or receiver electronics such that the transmitters and receivers may be swapped without affecting the gain compensation methodology that follows. Therefore, in the embodiment depicted on FIG. 8, the transmitters T1 and T2 may be swapped with the receivers R1 and R2 such that each transmitter includes a set of collocated linearly independent antennas and each receiver includes a tilted antenna. Such an embodiment would also include first and second calibration receivers, each including first and second collocated, transverse antennas To describe an example calibration procedure, consider the antennas on one of the subs. The d and e transmitting antennas are transverse to the local axial direction, perpendicular to one another, and oriented at an angle ψ (that is not 0 or 90 degrees) with respect to the local a and b receivers. The ratio of the DC terms of the voltage measured by the a and b receivers upon firing the d transmitter (during rotation of the drill string as indicated above in Equation 34) may be given as follows:

$$\frac{V_{TdRa\_DC}}{V_{TdRb\_DC}} = -\frac{g_{Ra}}{g_{Rb}} \frac{(Z_{xx}\cos(\psi) + Z_{yy}\cos(\psi) + Z_{xy}\sin(\psi) - Z_{yx}\sin(\psi))}{(Z_{xx}\sin(\psi) + Z_{yy}\sin(\psi) + Z_{yx}\cos(\psi) - Z_{xy}\cos(\psi))} \quad (43)$$

Likewise the ratio of the DC terms may also be obtained upon firing the e transmitter as follows:

$$\frac{V_{TeRa\_DC}}{V_{TeRb\_DC}} = \frac{g_{Ra}}{g_{Rb}} \frac{(Z_{xx}\sin(\psi) + Z_{yy}\sin(\psi) + Z_{yx}\cos(\psi) - Z_{xy}\cos(\psi))}{(Z_{xx}\cos(\psi) + Z_{yy}\cos(\psi) + Z_{xy}\sin(\psi) - Z_{yx}\sin(\psi))} \quad (44)$$

A gain ratio of the a to b receivers may then be obtained by combining Equations 43 and 44, for example as follows:

$$g_{ratio} = \frac{g_{Ra}}{g_{Rb}} = \sqrt{-\frac{V_{TdRa\_DC} V_{TeRa\_DC}}{V_{TdRb\_DC} V_{TeRb\_DC}}} \quad (45)$$

Using the gain ratio given in Equation 45, a fully gain compensated deep resistivity measurement may be obtained, for example, via firing the tilted transmitter antenna on the first sub and receiving the transmitted electromagnetic waves using the receiver antennas on the second sub. The measured voltage tensor may then be given, for example, as follows:

$$V_{TR}(0) = \begin{bmatrix} V_{TaRa\_DC} + V_{TaRa\_SHC} & g_{ratio}\left(\begin{matrix}V_{TaRb\_DC} + \\ V_{TaRb\_SHC}\end{matrix}\right) & V_{TaRc\_FHC} \\ -g_{ratio}\left(\begin{matrix}V_{TaRb\_DC} - \\ V_{TaRb\_SHC}\end{matrix}\right) & V_{TaRa\_DC} - V_{TaRa\_SHC} & V_{TaRc\_FHS} \\ V_{TaRa\_FHC} & V_{TaRb\_FHS} & V_{TaRc\_DC} \end{bmatrix} = \quad (46)$$

$$\begin{bmatrix} \sin(\beta)g_{Ta}g_{Ra}\hat{m}^t_{Ta\_perp}Z\hat{m}_{Ra} & \sin(\beta)g_{Ta}g_{Rb}\hat{m}^t_{Ta\_perp}Z\hat{m}_{Rb} & g_{Ta}g_{Rc}\hat{m}^t_{Ta\_perp}Z\hat{m}_{Rc} \\ \sin(\beta)g_{Ta}g_{Ra}\hat{m}^t_{Tb\_perp}Z\hat{m}_{Ra} & \sin(\beta)g_{Ta}g_{Rb}\hat{m}^t_{Tb\_perp}Z\hat{m}_{Rb} & g_{Ta}g_{Rc}\hat{m}^t_{Tb\_perp}Z\hat{m}_{Rc} \\ \cos(\beta)g_{Ta}g_{Ra}\hat{u}^t_T Z\hat{m}_{Ra} & \cos(\beta)g_{Ta}g_{Rb}\hat{u}^t_T Z\hat{m}_{Rb} & \cos(\beta)g_{Ta}g_{Rc}\hat{u}^t_T Z\hat{m}_{Rc} \end{bmatrix}$$

Using the equivalent transmitter and receiver gains given below:

$$G_T = \begin{bmatrix} g_{Ta}\sin(\beta) & 0 & 0 \\ 0 & g_{Ta}\sin(\beta) & 0 \\ 0 & 0 & g_{Ta}\cos(\beta) \end{bmatrix} \quad (47)$$

$$G_R = \begin{bmatrix} g_{Ra} & 0 & 0 \\ 0 & g_{Ra} & 0 \\ 0 & 0 & g_{Rc} \end{bmatrix} \quad (48)$$

and computing the quantity described above with respect to Equation 39 yields the fully compensated tensor quantity $\mathcal{M}_{12}(0)$:

$$\mathcal{M}_{12}(0) = \begin{bmatrix} \acute{U}_{12xx} & \acute{U}_{12xy} & \tan(\beta)\acute{U}_{12xz} \\ \acute{U}_{12yx} & \acute{U}_{12yy} & \tan(\beta)\acute{U}_{12yz} \\ \cot(\beta)\acute{U}_{12zx} & \cot(\beta)\acute{U}_{12zy} & \acute{U}_{12zz} \end{bmatrix} \quad (49)$$

The use of the aforementioned calibration transmitters may enable an electromagnetic logging tool to be constructed using fewer deep transmitters. Moreover, in the embodiments shown in FIGS. 7 and 8, the calibration transmitters and the tilted transmitter are not collocated, which may simplify the manufacture and fabrication of such logging tools.

It will be understood that the various methods disclosed herein for obtaining a full tensor gain compensated quantity may be implemented on a processor, which can include a downhole processor and/or a surface processor. By downhole processor, it is meant an electronic processor (e.g., a microprocessor or digital controller or the like) deployed in the drill string (e.g., in the electromagnetic logging tool or elsewhere in the BHA). In such embodiments, the full tensor gain compensated quantity may be stored in downhole memory and/or transmitted to the surface while drilling via known telemetry techniques (e.g., mud pulse telemetry or wired drill pipe). In some embodiments, the harmonic fitting coefficients may transmitted uphole and the compensated quantities may be computed at the surface using a surface processor. Whether transmitted to the surface or computed at the surface, the quantity may be utilized in an inversion process (along with a formation model) to obtain various formation parameters as described above. In other embodiments, a surface processor can be used, wherein the electromagnetic measurement data is transmitted to the surface, and the surface processor processes the measurements to obtain full tensor gain compensated quantities.

Although full tensor gain compensated propagation measurements have been described in detail, it should be understood that various changes, substitutions and alternations can be made herein without departing from the spirit and scope of the disclosure as defined by the appended claims.

What is claimed is:

1. A method for obtaining full tensor gain compensated propagation measurements, the method comprising:
   (a) rotating an electromagnetic logging tool in a subterranean borehole, the logging tool including at least first and second axially spaced transmitters and at least first and second axially spaced receivers, each of the receivers including a set of collocated linearly independent antennas, each of the transmitters including first and second collocated antennas, at least the first transmitter antenna having a tilted moment with respect to a longitudinal axis of the tool;
   (b) acquiring a plurality of voltage measurements while rotating the tool in (a), the plurality of voltage measurements obtained using a corresponding plurality of pairs of the transmitters and receivers;
   (c) fitting the voltage measurements to a harmonic expression to obtain harmonic coefficients;
   (d) causing a processor to process the harmonic coefficients to construct a full tensor voltage measurement; and
   (e) causing the processor to process the full tensor voltage measurement to obtain a fully gain compensated tensor quantity.

2. The method of claim 1, wherein the processor is a downhole processor.

3. The method of claim 2, further comprising:
   (f) transmitting the fully gain compensated tensor quantity to the surface; and
   (g) causing a surface computer to invert the fully gain compensated tensor quantity to obtain one or more properties of a subterranean formation.

4. The method of claim 2, further comprising:
   (f) causing the downhole processor to process the fully gain compensated tensor quantity to obtain a fully gain compensated tensor attenuation and a fully gain compensated tensor phase shift.

5. The method of claim 1, wherein the second transmitter antenna in each of the first and second transmitters has a transverse moment with respect to the longitudinal axis of the tool.

6. The method of claim 1, wherein:
   (d) further comprises causing the processor to process the harmonic coefficients to obtain first and second sets of full tensor voltage measurements; and
   (e) further comprises (i) causing the processor to process the first set of full tensor voltage measurements to obtain a first full tensor quantity, (ii) causing the processor to process the second set of full tensor voltage measurements to obtain a second full tensor quantity, and (iii) causing the processor to process the first and second full tensor quantities to obtain the fully gain compensated tensor quantity.

7. The method of claim 6, wherein the first set of full tensor voltage measurements are obtained at a toolface angle of zero degrees and the second set of full tensor voltage measurements are obtained at a toolface angle of ninety degrees.

8. The method of claim 7, wherein the fully gain compensated tensor quantity $\mathcal{M}_{12C}$ is computed in (e) as follows:

$$\mathcal{M}_{12C} = \begin{bmatrix} \sqrt{\mathcal{M}_{12}(0)_{xx}\mathcal{M}_{12}\left(\frac{\pi}{2}\right)_{xx}} & \sqrt{\mathcal{M}_{12}(0)_{xy}\mathcal{M}_{12}\left(\frac{\pi}{2}\right)_{xy}} & \cot(\beta_{T1})\mathcal{M}_{12}(0)_{xz} \\ \sqrt{\mathcal{M}_{12}(0)_{yx}\mathcal{M}_{12}\left(\frac{\pi}{2}\right)_{yx}} & \sqrt{\mathcal{M}_{12}(0)_{yy}\hat{\mathcal{M}}_{12}\left(\frac{\pi}{2}\right)_{yy}} & \cot(\beta_{T1})\hat{\mathcal{M}}_{12}(0)_{yz} \\ \tan(\beta_{T1})\hat{\mathcal{M}}_{12_{xz}}(0) & \tan(\beta_{T1})\hat{\mathcal{M}}_{12}\left(\frac{\pi}{2}\right)_{zy} & \sqrt{\mathcal{M}_{12}(0)_{zz}\hat{\mathcal{M}}_{12}\left(\frac{\pi}{2}\right)_{zz}} \end{bmatrix}$$

wherein $\mathcal{M}_{12}(0)$ represents the first full tensor quantity, $$\hat{\mathcal{M}}_{12}\left(\frac{\pi}{2}\right)$$

represents the second full tensor quantity mathematically rotated by negative ninety degrees, and $\beta_{T1}$ represents an angle between the moment of the first transmitter antenna and the longitudinal axis of the tool.

9. A system comprising:
   an electromagnetic logging tool having at least first and second axially spaced transmitters and at least first and second axially spaced receivers, each of the receivers including a set of collocated linearly independent antennas, each of the transmitters including first and second collocated antennas, at least the first transmitter antenna having a tilted moment with respect to a longitudinal axis of the tool, wherein the electromagnetic logging tool is configured to acquire a plurality of voltage measurements while rotating the electromagnetic logging tool in a borehole formed in a subterranean formation, the plurality of voltage measurements being obtained using a corresponding plurality of pairs of the transmitters and receivers; and
   a processor configured to fit the voltage measurements to a harmonic expression to obtain harmonic coefficients, process the harmonic coefficients to construct a full tensor voltage measurement, and process the full tensor voltage measurement to obtain a fully gain compensated tensor quantity.

10. The system of claim 9, comprising a telemetry circuit that transmits the fully gain compensated tensor quantity to a surface computer for inversion of the fully gain compensated tensor quantity to obtain one or more properties of the subterranean formation.

11. The system of claim 9, wherein the processor is further configured to process the harmonic coefficients to obtain first and second sets of full tensor voltage measurements, process the first set of full tensor voltage measurements to obtain a first full tensor quantity, process the second set of full tensor voltage measurements to obtain a second full tensor quantity, and process the first and second full tensor quantities to obtain the fully gain compensated tensor quantity.

12. The system of claim 9, wherein the processor is a downhole processor.

13. The system of claim 12, wherein the downhole processor processes the fully gain compensated tensor quantity to obtain a fully gain compensated tensor attenuation and a fully gain compensated tensor phase shift.

14. A method for obtaining gain compensated full tensor electromagnetic antenna measurements, the method comprising:
(a) rotating an electromagnetic logging tool in a subterranean borehole, the logging tool including at least first and second axially spaced transmitters and at least first and second axially spaced receivers, each of the receivers including a set of collocated linearly independent antennas, each of the transmitters including first and second collocated calibration antennas having transverse moments with respect to one another and with respect to the longitudinal axis of the tool, each of the transmitters further including a tilted antenna not collocated with the first and second calibration antennas and having a tilted moment with respect to a longitudinal axis of the tool;
(b) acquiring a plurality of voltage measurements while rotating the tool in (a), the plurality of voltage measurements obtained using a corresponding plurality of pairs of the tilted transmitter antennas and the receiver antennas;
(c) fitting the voltage measurements to a harmonic expression to obtain harmonic coefficients;
(d) causing a processor to process the harmonic coefficients to construct a full tensor voltage measurement; and
(e) causing the processor to process the full tensor voltage measurement to obtain a fully gain compensated tensor quantity.

15. The method of claim 14, wherein the processor is a downhole processor.

16. The method of claim 15, further comprising:
(f) transmitting the fully gain compensated tensor quantity to the surface; and
(g) causing a surface computer to invert the fully gain compensated tensor quantity to obtain one or more properties of a subterranean formation.

17. The method of claim 14, wherein the first and second collocated calibration antennas are oriented at a non zero degree and non 90 degree angle respect to a and b antennas in the receivers.

18. The method of claim 17, wherein (d) further comprises causing a processor to process the harmonic coefficients to compute a gain ratio of the a to b antennas in the receivers as follows:

$$g_{ratio} = \sqrt{-\frac{V_{TdRa\_DC}}{V_{TdRb\_DC}} \frac{V_{TeRa\_DC}}{V_{TeRb\_DC}}}$$

Wherein $g_{ratio}$ represents the gain ratio, $V_{TdRa\_DC}$, $V_{TdRb\_DC}$, $V_{TeRa\_DC}$, and $V_{TeRb\_DC}$ represent certain of the harmonic coefficients.

19. The method of claim 18, wherein full tensor voltage measurement is expressed as follows:

$$V_{TR}(0) = \begin{bmatrix} V_{TaRa\_DC} + V_{TaRa\_SHC} & g_{ratio}\begin{pmatrix} V_{TaRb\_DC} + \\ V_{TaRb\_SHC} \end{pmatrix} & V_{TaRc\_FHC} \\ -g_{ratio}\begin{pmatrix} V_{TaRb\_DC} + \\ V_{TaRb\_SHC} \end{pmatrix} & V_{TaRa\_DC} + V_{TaRa\_SHC} & V_{TaRc\_FHS} \\ V_{TaRa\_FHC} & V_{TaRb\_FHS} & V_{TaRc\_DC} \end{bmatrix}$$

wherein $V_{TR}(0)$ represents the full tensor voltage measurement, $g_{ratio}$ represents the gain ratio, and $V_{TaRa\_DC}$, $V_{TaRb\_DC}$, and $V_{TaRc\_DC}$, represent DC harmonic coefficients, $V_{TaRa\_FHC}$, $V_{TaRc\_FHC}$, and $V_{TaRc\_FHS}$ represent first harmonic coefficients, and $V_{TaRa\_SHC}$ and $V_{TaRb\_SHC}$ represent second harmonic coefficients.

20. The method of claim 14, wherein:
(d) further comprises causing the processor to process the harmonic coefficients to obtain a set of full tensor voltage measurements; and
(e) further comprises causing the processor to process the set of full tensor voltage measurements to obtain the fully gain compensated tensor quantity.

21. A system comprising:
an electromagnetic logging tool having at least first and second axially spaced transmitters and at least first and second axially spaced receivers, each of the receivers including a set of collocated linearly independent antennas, each of the transmitters including first and second collocated calibration antennas having transverse moments with respect to one another and with respect to the longitudinal axis of the tool, each of the transmitters further including a tilted antenna not collocated with the first and second calibration antennas and having a tilted moment with respect to a longitudinal axis of the tool, the electromagnetic logging tool being configured to acquire a plurality of voltage measurements while rotating in a subterranean borehole, the plurality of voltage measurements being obtained using a corresponding plurality of pairs of the tilted transmitter antennas and the receiver antennas; and
a processor configured to fit the voltage measurements to a harmonic expression to obtain harmonic coefficients, process the harmonic coefficients to construct a full tensor voltage measurement, and process the full tensor voltage measurement to obtain a fully gain compensated tensor quantity.

22. The system of claim 21, the first and second collocated calibration antennas are oriented at a non zero degree and non 90 degree angle respect to a and b antennas in the receivers.

* * * * *